US012286757B2

(12) United States Patent
Zeits et al.

(10) Patent No.: US 12,286,757 B2
(45) Date of Patent: Apr. 29, 2025

(54) AQUEOUS COMPOSITIONS WITH IMPROVED BARRIER PROPERTIES

(71) Applicant: BASF SE, Ludwigshafen am Rhein (DE)

(72) Inventors: Paul Zeits, Southfield, MI (US); Andrew Seecharan, Southfield, MI (US); Gary Deeter, Wyandotte, MI (US); Amirpouyan Sardashti, Southfield, MI (US)

(73) Assignee: BASF SE, Ludwigshafen am Rhein (DE)

( * ) Notice: Subject to any disclaimer, the term of this patent is extended or adjusted under 35 U.S.C. 154(b) by 238 days.

(21) Appl. No.: 17/755,901

(22) PCT Filed: Nov. 12, 2020

(86) PCT No.: PCT/EP2020/081879
§ 371 (c)(1),
(2) Date: May 11, 2022

(87) PCT Pub. No.: WO2021/094437
PCT Pub. Date: May 20, 2021

(65) Prior Publication Data
US 2022/0380981 A1    Dec. 1, 2022

Related U.S. Application Data

(60) Provisional application No. 62/936,020, filed on Nov. 15, 2019.

(51) Int. Cl.
| | |
|---|---|
| *D21H 21/16* | (2006.01) |
| *C09D 5/00* | (2006.01) |
| *C09D 5/02* | (2006.01) |
| *C09D 125/14* | (2006.01) |
| *C09D 125/16* | (2006.01) |
| *C09D 133/06* | (2006.01) |
| *D21H 17/37* | (2006.01) |
| *D21H 19/12* | (2006.01) |
| *D21H 27/10* | (2006.01) |

(52) U.S. Cl.
CPC .............. *D21H 21/16* (2013.01); *C09D 5/00* (2013.01); *C09D 5/022* (2013.01); *C09D 125/14* (2013.01); *C09D 125/16* (2013.01); *C09D 133/064* (2013.01); *D21H 17/37* (2013.01); *D21H 19/12* (2013.01); *D21H 27/10* (2013.01)

(58) Field of Classification Search
CPC ........ D21H 21/16; D21H 17/37; D21H 19/12; D21H 27/10; D21H 17/34; D21H 19/20; C09D 5/00; C09D 5/022; C09D 125/14; C09D 125/16; C09D 133/064; C09D 7/65; C09D 7/63; C09D 133/00; C08F 220/06; C08F 220/10
See application file for complete search history.

(56) References Cited

U.S. PATENT DOCUMENTS

| | | | |
|---|---|---|---|
| 546,160 | A | 9/1895 | Kimball |
| 3,308,078 | A | 3/1967 | Rogers et al. |
| 4,258,104 | A | 3/1981 | Lee et al. |
| 4,414,370 | A | 11/1983 | Hamielec et al. |
| 4,529,787 | A | 7/1985 | Schmidt et al. |
| 10,422,081 | B2 | 9/2019 | Hayes et al. |
| 2007/0232743 | A1* | 10/2007 | Laviolette ............... D21H 19/42 524/451 |
| 2020/0299902 | A1* | 9/2020 | Deeter .................. C08F 220/18 |

FOREIGN PATENT DOCUMENTS

| | | |
|---|---|---|
| EP | 0096901 A2 | 12/1983 |
| JP | H08211611 A | 8/1996 |
| WO | 1998008882 A1 | 3/1998 |
| WO | 2007113121 A1 | 10/2007 |
| WO | WO-2017210606 A1 * | 12/2017 ............ C08F 212/12 |
| WO | 2018229343 A1 | 12/2018 |

OTHER PUBLICATIONS

International Search Report and Written Opinion for corresponding PCT/EP2020/081879 mailed Apr. 22, 2021; 10 pages.
A.S. Sarac, "Redox polymerization", Progress in Polymer Science, vol. 24, Issue 8, Oct. 1, 1999, pp. 1149-1204.
Antonietti, et al., "90 Years of Polymer Latexes and Heterophase Polymerization: More vital than ever", Macromolecular Chemistry and Physics, vol. 204, Issue 2, Feb. 19, 2003, pp. 207-219.

* cited by examiner

*Primary Examiner* — Dennis R Cordray
*Assistant Examiner* — Matthew M Eslami
(74) *Attorney, Agent, or Firm* — Armstrong Teasdale LLP

(57) ABSTRACT

Described herein is an aqueous composition to improve barrier properties. Particularly, described herein is a polymer-based grease resistant aqueous composition for coating paper and paper products.

38 Claims, No Drawings

AQUEOUS COMPOSITIONS WITH IMPROVED BARRIER PROPERTIES

CROSS-REFERENCE TO RELATED APPLICATIONS

This application is a U.S. National Phase Application of PCT/EP2020/081879, filed Nov. 12, 2020, which claims the benefit of priority to U.S. Provisional Patent Application No. 62/936,020, filed Nov. 15, 2019, the entire contents of which are hereby incorporated by reference herein.

FIELD OF THE DISCLOSURE

The presently claimed invention relates to an aqueous composition to improve barrier properties. Particularly, the presently claimed invention relates to a polymer-based grease resistant coating compositions.

BACKGROUND

Sustainable packages using renewable, recyclable materials are increasingly and strongly desired for especially food services and food packaging. Paper or paperboard is one of the most sustainable materials for packaging applications and they are generally coated with compositions to provide barrier properties to fulfil the requirements of packaging. Barrier properties are important in reducing the penetration of moisture, oil, grease, aromas and in some case, bacteria. Therefore, there is ongoing trend to provide coating compositions and surface sizing techniques to paper or paperboard substrates in the paper industry to provide barrier properties and other desired and beneficial attributes to paper. Properties which are provided to paper by coating compositions include porosity reduction to air, water resistance, oil and grease resistance, higher surface strength, quality and ease of printing of the paper.

A coating composition which is widely used commercially to impart oil and grease resistance to paper contains fluorochemicals. While such coating compositions are effective, they are not environmentally friendly and raise various health and safety concerns because of their toxic nature. Another well-known type of coating conventionally used is compositions with plastic films such as polyethylene and polypropylene to provide barrier properties and flexibility for making foldable carboard. However, these films though provide good barrier properties and foldability, they limit recyclability and pulpability of the paper product coated. Water based coatings are environmentally friendly alternative to polyethylene coatings since they can be recycled and repulped. However, the water-based coating known in the art are not suitable for foldable cardboard since cracks form in the folds result in a decrease of barrier properties.

For a coating to be effective, it must constitute flexible films capable of resistance to penetration by oil and/or grease. In addition, it is important that these properties remain intact after the paper or paperboard substrate is converted from a flat sheet to a label or package. The property of blocking or in other words the tendency of layers in a roll of paperboard to stick to one another is another hurdle in production and converting process of coated paperboard. These are some of the limitations in the existing barrier coating compositions.

Therefore, there is a need for improved coating compositions that can overcome the above-mentioned drawbacks for use in production of oil and grease resistant paper which is safe for environment and consumer. There is also a need for improved coating compositions that can provide properties such as blocking resistance and foldability to paper and paper substrates that can also be recycled and repulped at low cost.

Hence, it is an object of the presently claimed invention to provide an improved composition for oil and grease resistance of paper that is both environment friendly and safe. Another object of the presently claimed invention is to provide an improved composition that can provide good barrier properties, blocking resistance and foldability to paper.

SUMMARY OF THE DISCLOSURE

Surprisingly, it was found that the aqueous composition disclosed herein comprising at least one first polymer and at least one second polymer provides improved properties on coating such as block resistance, grease resistance, foldability to paper or paper substrates. Still further, the composition not only provides improved properties but also enables easy printability, recyclability and repulpability of paper and is environment friendly.

Accordingly, in one aspect, the presently claimed invention is directed to an aqueous composition comprising
(i) at least one first polymer in an amount in the range of from about 10 wt. % to about 90 wt. % derived from at least one first monomer selected ethylenically substituted aromatic compounds and at least one second monomer selected from the group consisting of as (meth)acrylonitrile, (meth)acrylamide, (meth)acrylic acid, alkyl (meth)acrylates and mixtures thereof; and
(ii) at least one second polymer in an amount in the range of from about 10 wt. % to about 90 wt. % comprising the reaction product of a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof; and wherein the wt. % in each case is based on the total weight of the aqueous composition.

In accordance with another aspect of the presently claimed invention, there is provided a substrate comprising at least one surface coated with at least one layer comprising an aqueous composition described herein.

In accordance with another aspect of the presently claimed invention, there is provided a coated paper or an article comprising the aqueous composition described herein.

In accordance with another aspect of the presently claimed invention, there is provided a method of making paper comprising at least the step of contacting a cellulosic fiber with an aqueous composition described herein.

Other objects, advantages and applications of the presently claimed invention will become apparent to those skilled in the art from the following detailed description.

DETAILED DESCRIPTION

The presently claimed invention is not to be limited in terms of the embodiments described in this application. Modifications and variations can be made without departing from its spirit and scope, as will be apparent to those skilled in the art. Functionally equivalent methods, formulations, and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to methods, reagents, compounds, or compositions, which can, of course, vary. It is also to be understood that the terminology used herein is for the purpose of describing embodiments only and is not intended to be limiting.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the subject matter described herein are capable of operation in other sequences than described or illustrated herein. In case the terms "(A)", "(B)" and "(C)" or "(a)", "(b)", "(c)", "(d)", "(i)", "(ii)" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

For the purposes of the presently claimed invention, where features or aspects of the disclosure are described in terms of Markush groups, those skilled in the art will recognize that the disclosure is also thereby described in terms of any individual member or subgroup of members of the Markush group.

For the purposes of the presently claimed invention, all ranges disclosed herein also encompass any and all possible subranges and combinations of subranges thereof. The ranges defined throughout the specification include the end values as well, i.e. a range of 1 to 10 implies that both 1 and 10 are included in the range. For the avoidance of doubt, the applicant shall be entitled to any equivalents according to applicable law. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether explicitly indicated. A value modified by the term "about" of course includes the specific value. For instance, "about 5.0" must include 5.0.

In the following passages, different aspects of the subject matter are defined in more detail. Each aspect so defined may be combined with any other aspect or aspects unless clearly indicated to the contrary. Any feature indicated as being preferred or advantageous may be combined with any other feature or features indicated as being preferred or advantageous.

Reference throughout this specification to "one embodiment" or "an embodiment" means that a feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment but may refer. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the subject matter, and form different embodiments, as would be understood by those in the art. For example, in the appended claims, any of the claimed embodiments can be used in any combination.

Although the embodiments disclosed herein have been described with reference to embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The term "coating" as used herein refers to any surface treatment applied to paper. The term "barrier properties" as used herein refers to an increase in resistance of paper to various materials such as air, oil, grease, and higher surface strength. The term "block resistance" as disclosed herein refers to the capability of the coating when applied to two surfaces not to stick to itself upon contact or when pressure is applied. The term "oil and/or grease resistance" as disclosed herein refers to ability of the substrate on coating to resist the formation of surface spots or stains or permeation of oil/grease through the substrate.

For purposes of the presently claimed invention, paper or paperboard substrate or paper products as used herein can be any article of manufacture, at least a portion of which comprises paper coated in accordance with the presently claimed invention. The presently claimed invention encompasses paper products made of either single or multiple layers, e.g., a paper laminate, plastic laminate. The term "repulping" or "repulpability" used interchangeably herein is the ability of the coated paper or paperboard substrate to undergo the operation of re-wetting and fiberizing for subsequent paper sheet formation. The term "recycling" or "recyclability" used interchangeably herein is the ability of used treated paper and paperboard to be processed into new paper and paperboard.

The term "paper-based substrate" or "paperboard substrate" as used herein refers to any type of cellulosic fiber-based product which can folded manually or mechanically.

The term "aqueous" as used herein refers to a significant fraction of water as the main dispersion medium besides organic solvents.

The use of (meth) in a monomer or repeat unit indicates an optional methyl group. The term "copolymer" means that the copolymer comprises block or random copolymers obtainable by radical polymerization.

For the purposes of the presently claimed invention, the coating according to the presently claimed invention can be applied to paper or paperboard by any conventional coating and surface sizing technique. The technique includes but is not limited to, size press, tub, gate roll and spray applicators.

The term '% by weight' or 'wt. %' as used in the presently claimed invention is with respect to the total weight of the composition. Further, the sum of wt.-% of all the compounds, as described hereinbelow, in the respective component adds up to 100 wt.-%.

The term "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; enamines; imides; isocyanates; isothiocyanates; cyanates; thiocyanates; imines; nitro groups; nitriles (i.e., CN); and the like. Alkyl groups, as used herein, include straight chain and branched alkyl groups having from 1 to 20 carbon atoms, and typically from 1 to 12 carbons or, in some embodiments, from 1 to 8, 1 to 6, or 1 to 4 carbon atoms. In some embodiments, alkyl groups include straight chain and/or branched alkyl groups having from 12 to 18 carbons.

The alkyl groups described herein further include cycloalkyl groups having 3 to 8 ring members. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the branched alkyl groups have at least 8 carbons. Cycloalkyl groups, as used herein, are cyclic alkyl groups such as, but are not limited to, cyclopropyl, cyclobutyl, cyclopentyl, cyclohexyl, cycloheptyl, and cyclooctyl groups, and include bridged cycloalkyl groups. Representative substituted alkyl groups can be unsubstituted or substituted.

An aspect of the presently claimed invention relates to an aqueous composition comprising:
(i) at least one first polymer in an amount in the range of from about 10 wt. % to about 90 wt. % derived from at least one first monomer selected from ethylenically substituted aromatic compounds and at least one second monomer selected from the group consisting of as (meth)acrylonitrile, (meth)acrylamide, (meth)acrylic acid, alkyl (meth)acrylates and mixtures thereof; and
(ii) at least one second polymer in an amount in the range of from about 10 wt. % to about 90 wt. % comprising the reaction product of a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof; and wherein the wt. % in each case is based on the total weight of the aqueous composition.

In an embodiment of the presently claimed invention, the aqueous composition disclosed herein is provided as a coating to provide barrier properties to a substrate. For purposes of the presently claimed invention, the substrate includes but is not limited to paper and paper products. In another embodiment of the presently claimed invention the aqueous composition disclosed herein is provided as a coating to provide barrier properties to paper and paper products. In yet another embodiment of the presently claimed invention, use of the aqueous composition disclosed herein for coating is provided. For purposes of the presently claimed invention, the aqueous composition disclosed herein is interchangeably referred to as barrier composition.

In an embodiment of the presently claimed invention, a paper coating composition is an aqueous composition comprising
(i) at least one first polymer in an amount in the range of from about 10 wt. % to about 90 wt. % derived from at least one first monomer selected from ethylenically substituted aromatic compounds and at least one second monomer selected from the group consisting of as (meth)acrylonitrile, (meth)acrylamide, (meth)acrylic acid, alkyl (meth)acrylates and mixtures thereof; and
(ii) at least one second polymer in an amount in the range of from about 10 wt. % to about 90 wt. % comprising the reaction product of a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof; and wherein the wt. % in each case is based on the total weight of the aqueous composition.

In an embodiment of the presently claimed invention, the at least one first polymer is present in an amount in the range of from about 50 wt. % to about 90 wt. %, based on the total weight of the aqueous composition.

In another embodiment of the presently claimed invention the at least one second polymer is present in an amount in the range of from about 10 wt. % to about 50 wt. %, based on the total weight of the aqueous composition.

In another embodiment of the presently claimed invention, the aqueous composition described herein comprises at least one first polymer in an amount in the range of from about 10 wt. % to about 90 wt. % derived from at least one first monomer selected from ethylenically substituted aromatic compounds and at least one second monomer selected from the group consisting of as (meth)acrylonitrile, (meth)acrylamide, (meth)acrylic acid, alkyl (meth)acrylates and mixtures thereof; and a wax from about 0.1 wt. % to about 20 wt. %, wherein the wt. % in each case is based on the total weight of the aqueous composition.

In yet another embodiment of the presently claimed invention, the aqueous composition disclosed herein when dried, provides a water uptake of less than about 5 g/m$^2$/20 minutes, and sufficient block resistance to impart no substrate damage. In another embodiment of the presently claimed invention, a paper coated with the aqueous composition disclosed herein shows block resistance at 50° C. and 60 psi for 24 hours, i.e. the polymer binder is coated onto each of two sheets which are layered coating-to-paper (face-to-back, F-B) or coating-to-coating (face-to-face, F-F).

In an embodiment of the presently claimed invention, the ratio of the volume average particle size of the at least one first polymer to the volume average particle size of the at least one second polymer is in the range of from about 20:1 to 2:1. In another embodiment of the presently claimed invention, the ratio of the volume average particle size of the at least one first polymer to the volume average particle size of the at least one second polymer is in the range of from about 10:1 to 2:1. In another embodiment of the presently claimed invention, the ratio of the volume average particle size of the at least one first polymer to the volume average particle size of the at least one second polymer is in the range of from 8:1 to 2:1. In another embodiment of the presently claimed invention, the ratio of the volume average particle size of the at least one first polymer to the volume average particle size of the at least one second polymer is in the range of from 4:1 to 2:1 or in the range of from 3:1 to 2:1.

In another embodiment of the presently claimed invention, the viscosity of the aqueous composition is in the range of from about 100 cP to about 2500 cP. In yet another embodiment of the presently claimed invention, the viscosity of the aqueous composition is in the range of from about 100 cP to about 1500 cP. In yet another embodiment of the presently claimed invention, the viscosity of the aqueous composition is in the range of from about 100 cP to about 500 cP, in each case measured using a viscometer with a #2 spindle at 50 rpm at 23° C.

In an embodiment of the presently claimed invention, the solid content of the aqueous composition is in the range of from about 20 wt. % to about 70 wt. %. In another embodiment of the presently claimed invention, the solid content of the aqueous composition is in the range of from about 20 wt. % to about 60 wt. %. In another embodiment of the presently claimed invention, the solid content of the aqueous composition is in the range of from about 40 wt. % to about 60 wt. %, in each case based on the total weight of the aqueous composition.

In an embodiment of the presently claimed invention, the weight average molecular weight (Mw) of the first polymer present in the aqueous composition can be at least 100 kDa for e.g., from 20 kDa to 500 kDa, from 50 kDa to 250 kDa, from 100 kDa to 200 kDa., in each case determined according to gel permeation chromatography.

In an embodiment of the presently claimed invention, the volume average particle size diameter of the first polymer is in the range of from about 90 nm to about 400 nm. In another embodiment of the presently claimed invention, the volume average particle size diameter of the first polymer is in the range of from about 90 nm to about 300 nm. In another embodiment of the presently claimed invention, the volume average particle size diameter of the first polymer is in the range of from about 100 nm to about 200 nm, in each case measured by dynamic light scattering technique.

In an embodiment of the presently claimed invention, wherein the viscosity of the first polymer is in the range of from about 100 cP to about 2500 cP. In another embodiment of the presently claimed invention, wherein the viscosity of the first polymer is in the range of from about 200 cP to about 2000 cP. In another embodiment of the presently claimed invention, wherein the viscosity of the first polymer is in the range of from about 200 cP to about 1000 cP, in each case measured using a viscometer with a #2 spindle at 50 rpm at 23° C.

For the purposes of the presently claimed invention, the first monomer of the first polymer can include any aromatic monomer known in the art. In another embodiment of the presently claimed invention, the first monomer is a vinyl aromatic monomer. In a yet another embodiment of the presently claimed invention, the first monomer is an ethylenically substituted aromatic compound. Examples of ethylenically substituted aromatic compounds can include but are not limited to vinyl aromatic monomers such as styrene, alkylstyrenes such as: alpha. - and p-methylstyrene, alpha-butylstyrene, 4-n-butylstyrene, 4-n-decylstyrene, and vinyltoluene, indene, methylindenes, or a combination thereof.

In an embodiment of the presently claimed invention, the first polymer can be derived from at least 40% or greater, at least 45% or greater, at least 50% or greater, at least 55% or greater, at least 60% or greater, at least 65% or greater, at least 70% or greater, at least 75% or greater, at least 80% or greater, or at least 5% or greater, by weight of the aromatic monomer.

In another embodiment of the presently claimed invention, the first polymer is derived from 95% or less, 90% or less, 85% or less, 80% or less, 75% or less, 70% or less, 65% or less, or 60% or less, by weight of the aromatic monomer. In yet another embodiment of the presently claimed invention, the first polymer can be derived from 40% to 95%, 40% to 90%, 45% to 90%, 45% to 80%, or 50% to 80%, by weight of the aromatic monomer. In another embodiment of the presently claimed invention, the first polymer can be derived from 2% to 40%, 5% to 40%, 5% to 35%, 5% to 30%, or 5% to 25%, by weight of the aromatic monomer.

For the purposes of the presently claimed invention, the second monomer of the first polymer can include any ethylenically unsaturated aliphatic monomer known in the art. In an embodiment of the presently claimed invention, the second monomer is selected from the group consisting of as (meth)acrylonitrile, (meth)acrylamide, (meth)acrylic acid, alkyl (meth)acrylates and mixtures thereof. Examples of alkyl (meth)acrylates monomers can include esters of alpha, beta-monoethylenically unsaturated monocarboxylic having 3 to 6 carbon atoms with alkanols having 1 to 12 carbon atoms, for e.g., esters of acrylic acid, methacrylic acid, maleic acid, fumaric acid, or itaconic acid, with $C_1$-$C_{12}$, $C_1$-$C_{10}$, $C_1$-$C_8$, or $C_1$-$C_4$ alkanols. In some examples, the alkyl (meth)acrylate monomers can include but are not limited to methyl acrylate, ethyl acrylate, butyl acrylate, 2-ethylhexyl acrylate, methyl methacrylate, or combinations thereof.

In an embodiment of the presently claimed invention, the first polymer can be derived from 5% or greater, 10% or greater, 15% or greater, 20% or greater, 25% or greater, or 30 or greater, by weight of the second monomer. In another embodiment of the presently claimed invention, the copolymer can be derived from 60% or less, 55% or less, 50% or less, 45% or less, 40% or less, or 35% or less, by weight of the second monomer. In a yet another embodiment of the presently claimed invention, the copolymer can be derived from 5% to 60%, 10% to 60%, 10% to 50%, 15% to 600/0, or 15% to 50%, by weight of the second monomer.

In an embodiment of the presently claimed invention, the amount of the first monomer is in the range of from about 10 wt. % to about 50 wt. % and the amount of the second monomer is in the range of from about 10 wt. % to about 90 wt. %, in each case based on the total weight of the first polymer. In another embodiment of the presently claimed invention, the amount of first monomer is in the range of from about 10 wt. % to about 40 wt. % and the amount of the second monomer is in the range of from about 20 wt. % to about 90 wt. %, in each case based on the total weight of the first polymer. In yet another embodiment of the presently claimed invention, the amount of the at least one first monomer is in the range of from about 10 wt. % to about 30 wt. % and the amount of the at least one second monomer is in the range of from about 70 wt. % to about 90 wt. %, in each case based on the total weight of the first polymer. The second monomer can be a mixture of at least two different monomers.

For the purposes of the presently claimed invention, the first polymer can be further derived from additional monomers. Examples of additional monomers include but are not limited to carboxylic acid monomers such as alpha monoethylenically unsaturated monocarboxylic/dicarboxylic acid, beta-monoethylenically unsaturated monocarboxylic/dicarboxylic acids, citraconic acid, styrene carboxylic acid, (meth)acrylic acid, itaconic acid, fumaric acid, crotonic acid, dimethacrylic acid, ethylacrylic acid, allylacetic acid, vinylacetic acid, maleic acid, mesaconic acid, methylenemalonic acid, and citraconic acid. Further examples of additional monomers include but are not limited to anhydrides of alpha., Beta.-monoethylenically unsaturated mono- and dicarboxylic acids, such as maleic anhydride, itaconic anhydride, and methylmalonic anhydride; (meth)acrylonitrile; vinyl and vinylidene halides such as vinyl chloride and vinylidene chloride; vinyl esters of $C_1$-$C_{18}$ mono- or dicarboxylic acids such as vinyl acetate, vinyl propionate, vinyl n-butyrate, vinyl laurate and vinyl stearate; $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate).

Further examples of additional monomers or co-monomers that can be used include but are not limited to linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamine)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); phosphorus-containing monomers (e.g., dihydrogen phosphate esters of alcohols in which the alcohol contains a polymerizable vinyl or olefenic group, allyl phosphate, phosphoalkyl(meth)acrylates such as 2-phosphoethyl(meth)acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H2C=C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, .alpha.-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof); alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate,2-(N,N,N-trimethylammonium)ethyl(meth)acrylate chloride,2-dimethylaminoethyl(meth)acrylamide, acrylonitrile, 3-dimethylaminopropyl(meth)acrylamide, and 3-trimethylammoniumpropyl(meth)acrylamide chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanote, vinyl neo-decanoate, vinyl neo-undecanoate, vinyl neo-dodecanoate and mixtures thereof, and copolymerizable surfactant monomers (e.g., those sold under the trademark ADEKA REASOAP).

The additional monomers used to produce the copolymers can also include but are not limited to a crosslinking monomer. For example, the crosslinking monomer can include diacetone acrylamide (DAAM) or a self-crosslinking monomer such as a monomer comprising 1,3-diketo groups or a silane crosslinker. Examples of monomers comprising 1,3-diketo groups include acetoacetoxyalkyl (meth)acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; and combinations thereof. Examples of suitable silane crosslinkers include 3-methacryloxypropyl trimethoxysilane, 3-mercaptopropyl trimethoxysilane, vinyl-triethoxysilane, and polyvinyl-siloxane oligomers such as DYNASYLAN® 6490, a polyvinyl siloxane oligomer derived from vinyltrimethoxysilane, and DYNASYLAN® 6498, a polyvinyl siloxane oligomer derived from vinyltriethoxysilane, both commercially available from Evonik Degussa GmbH (Essen, Germany). Crosslinkable monomers as described herein can further include monomers such as divinylbenzene; 1,4-butanediol diacrylate; methacrylic acid anhydride; and monomers containing urea groups (e.g., ureidoethyl (meth) acrylate, acrylamidoglycolic acid, and methacrylamidoglycolate methyl ether). Additional examples of crosslinkable monomers include N-alkylolamides of alpha, beta.-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Other exemplary crosslinkable monomers include diesters or triesters of dihydric and trihydric alcohols with alpha., beta.-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the copolymer can be derived from 0 wt. % to 5 wt. % of one or more crosslinkable monomers. In an embodiment of the presently claimed invention, the crosslinking agent can be used in an amount of from 0.01 wt. % to 5 wt. %, based on the weight of the copolymer.

In an embodiment of the presently claimed invention, the additional monomers in the copolymers disclosed herein can be in range of about 10% by weight or less, 7.5% by weight or less, 5% by weight or less, 4% by weight or less, 3% by weight or less, 2% by weight or less, 1.5% by weight or less, 1% by weight or less, or 0.5% by weight or less, based on the total weight of the copolymer.

In an embodiment of the presently claimed invention, the first polymer is derived from only one first monomer and at least one second monomer. In another embodiment of the presently claimed invention, the first polymer is derived from at least one first monomer and only one second monomer. In yet another embodiment of the presently claimed invention, at least one first monomer is different from the at least one second monomer. For example, the first polymer can be derived from styrene, acrylonitrile and other monomers. In another embodiment of the presently claimed invention, the first polymer can be derived from styrene and one or more esters of alpha, beta-monoethylenically unsaturated monocarboxylic acid monomers such as butyl acrylate, 2-ethylhexyl acrylate, ethyl acrylate, methyl acrylate, methyl methacrylate, or combinations thereof and of alpha., beta.-monoethylenically unsaturated monocarboxylic acid monomers.

In an embodiment of the presently claimed invention, the second polymer comprises a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof. In another embodiment of the presently claimed invention, the partially neutralized, acid-functional support resin is selected from an ammonium salt of a modified acrylic copolymer, an amine salt of a modified acrylic copolymer, and a mixture thereof. Examples of modified acrylic copolymers include but are not limited to polymers derived from (meth)acrylic acid monomers, (meth)acrylate monomers, vinyl aromatic monomers, or combinations thereof. In another embodiment of the presently claimed invention, the acid-functional support resin or solid grade oligomer can be derived from styrene, alkylstyrenes such as alpha.-methyl styrene, alpha., Beta.-monoethylenically unsaturated carboxylic acids having 3 to 6 carbon atoms, salts or esters of alpha., Beta.-monoethylenically unsaturated carboxylic acids having 3 to 6 carbon atoms with alkanols having 1 to 12 carbon atoms, for e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanol; alkoxy (meth)acrylates, or a combination thereof. Examples of salts or esters of alpha, beta.-monoethylenically unsaturated carboxylic acids can include butyl acrylate, 2-ethylhexyl acrylate, ethyl acrylate, methyl acrylate, methyl methacrylate, alkoxy (meth)acrylates such as carbitol methacrylate, or mixture thereof. In an embodiment of the presently claimed invention, the solid grade oligomer is an ammonium salt of a styrene-acrylic copolymer, an amine salt of a styrene-acrylic copolymer, or a combination thereof.

In an embodiment of the presently claimed invention, the weight average molecular weight of the second polymer is in the range of from about 100 kDa to about 1000 kDa determined according to gel permeation chromatography. For example, the weight average molecular weight of the second polymer is from 200 kDa to 1,000 kDa, from 300 kDa to 900 kDa, from 500 kDa to 900 kDa.

In an embodiment of the presently claimed invention, the volume average particle size diameter of the second polymer is in the range of from about 50 nm to about 200 nm. In another embodiment of the presently claimed invention, the volume average particle size diameter of the second polymer is in the range of from about 50 nm to about 150 nm. In another embodiment of the presently claimed invention, wherein the volume average particle size diameter of the second polymer is in the range of from about 50 nm to about 100 nm, in each case measured by dynamic light scattering technique.

In an embodiment of the presently claimed invention, the viscosity of the second polymer is in the range of from about 1000 cP to about 5000 cP. In another embodiment of the presently claimed invention, the viscosity of the second polymer is in the range of from about 1000 cP to about 4000 cP. In another embodiment of the presently claimed invention, wherein the viscosity of the first polymer is in the range of from about 1000 cP to about 2000 cP, in each case measured using a viscometer with a #2 spindle at 50 rpm at 20 C.

In an embodiment of the presently claimed invention, the weight average molecular weight (Mw) of the partially neutralized, acid-functional support resin present in the composition can be 20 kDa or less, for e.g., from 2 kDa to 20 kDa, from 2 kDa to 15 kDa, from 2 kDa to 10 kDa. In another embodiment of the presently claimed invention, the weight average molecular weight of the copolymers present in the composition can be 20 kDa or less, 18 kDa or less, 15 kDa or less, 12 kDa or less, 10 kDa or less, 8 kDa or less, or 7 kDa or less, in each case determined according to gel permeation chromatography.

In another embodiment of the presently claimed invention, the number average molecular weight (Mn) of the partially neutralized, acid-functional support resin present in the composition can be 20 kDa or less, for e.g., from 2 kDa to 20 kDa, from 2 kDa to 15 kDa, from 2 kDa to 10 kDa. In yet another embodiment of the presently claimed invention, the number average molecular weight of the copolymers present in the composition can be 20 kDa or less, 18 kDa or less, 15 kDa or less, 12 kDa or less, 10 kDa or less, 8 kDa or less, or 7 kDa or less, in each determined according to gel permeation chromatography.

In an embodiment of the presently claimed invention, partially neutralized refers to refer to neutralization of about 5 mol % or more, up to an including about 95%, of the acid groups on the acid-functional resin. In another embodiment of the presently claimed invention, partially neutralized refers to neutralization of from about 20 mol % to about 95 mol % of the acid groups on the acid-functional resin. This may include in various embodiments at least about 5 mol % of the acid groups, at least about 10 mol % of the acid groups, from about 10 mol % to about 95 mol % of the acid groups, from about 8 mol % to about 85 mol % of the acid groups, or from about 15 mol % to about 50 mol % of the acid groups, or from about 35 mol % to about 50 mol % of the acid groups. In yet another embodiment of the presently claimed invention, partially neutralized refers to neutralization of about 30 mol % of the acid groups on the acid-functional resin.

In an embodiment of the presently claimed invention, the partially neutralized, acid-functional support resin is neutralized with a base selected from the group consisting of ammonia, sodium hydroxide, potassium hydroxide, organic amine and mixtures thereof. In an embodiment of the presently claimed invention, the second polymer comprises a partially neutralized, acid-functional support resin in an amount of about 5 wt. % to about 50 wt. % and at least one ethylenically-unsaturated monomer in an amount in the range of from about 5 wt. % to about 50 wt. %, in each case based on the total weight of the second polymer. In another embodiment of the presently claimed invention the second polymer comprises a partially neutralized, acid-functional support resin in an amount of about 10 wt. % to about 50 wt. % and at least one ethylenically-unsaturated monomer in an amount in the range of from about 10 wt. % to about 40 wt. %, in each case based on the total weight of the second polymer. In yet another embodiment of the presently claimed invention, the second polymer comprises a partially neutralized, acid-functional support resin in an amount of about 10 wt. % to about 30 wt. % and at least one ethylenically-unsaturated monomer in an amount in the range of from about 10 wt. % to about 30 wt. %, in each case based on the total weight of the second polymer.

The partially neutralized, acid-functional support resin can react during the polymerization of the first monomer and the second monomer and become covalently linked to the second polymer. In an embodiment of the presently claimed invention, the partially neutralized, acid-functional support resin is grafted to the second polymer. In an embodiment of the presently claimed invention, the aqueous composition is derived from 8 wt. % to 40 wt. % partially neutralized, acid-functional support resin, for e.g., from 10 wt. % to 40 wt. %, from 10 wt. % to 35 wt. %, from 15 wt. % to 35 wt. %, 20 wt. % to 30 wt. %, based on the total weight of the solids in the composition.

In an embodiment of the presently claimed invention, the aqueous composition is derived from 5 wt. % to 85 wt. % by weight styrene, for e.g., from 10 wt. % to 70 wt. %, from 15 wt. % to 65 wt. %, from 20 wt. % to 60 wt. %, from 25 wt. % to 50 wt. %. In another embodiment of the presently claimed invention, the aqueous composition is derived from 5 wt. %-60 wt. % by weight butadiene, for e.g., from 10 wt. % to 60 wt. %, from 15 wt. % to 65 wt. %, from 25 wt. % to 60 wt. %, from 25 wt. % to 50 wt. %, from 30 wt. % to 45 wt. %. In another embodiment of the presently claimed invention, the aqueous composition is derived from 10 wt. % to 40 wt. % by weight solid grade oligomer, for e.g., from 10 wt. % to 35 wt. %, from 15 wt. % to 35 wt. %, or from 20 wt. % to 30 wt. %. In yet another embodiment of the presently claimed invention, the copolymer can be derived from one or more monomers in addition to styrene and (meth)acrylate ester such as (meth)acrylonitrile, (meth)acrylamide and/or a carboxylic acid monomer (e.g., (meth) acrylic acid).

In an embodiment of the presently claimed invention, the first monomer includes styrene and the second monomer includes a (meth)acrylate-based monomer. For example, the (meth)acrylic acid-based monomer can include esters of (meth)acrylic acid such as butyl acrylate, 2-ethylhexyl acrylate, ethyl acrylate, methyl acrylate, or methyl methacrylate. In another embodiment of the presently claimed invention, the copolymer is derived from 5 wt. %-85 wt. % by weight styrene, for e.g., from 1 wt. % to 70 wt. %, from 15 wt. % to 65 wt. %, from 20 wt. % to 60 wt. %, or from 25 wt. % to 50 wt. %, In another embodiment of the presently claimed invention, the copolymer is derived from 5 wt. % to 60 wt. % by weight (meth)acrylate-based monomer, for e.g., from 10 wt. % to 60 wt. %, from 15 wt. % to 65 wt. %, from 25 wt. % to 60 wt. %, from 25 wt. % to 50 wt. %, or from 30 wt. % to 45 wt. %. In another embodiment of the presently claimed invention, the copolymer is derived from 1 wt. % to 40 wt. % by weight solid grade oligomer, for e.g., from 10 wt. % to 35 wt. %, from 15 wt. % to 35 wt. %, or from 20 wt. % to 30 wt. %. In yet another embodiment of the presently claimed invention, the copolymer can be derived from one or more monomers in addition to styrene and a (meth)acrylate-based monomer such as (meth)acrylamide, a carboxylic acid monomer (e.g., (meth)acrylic acid), a phosphate-based monomer (e.g., PEM), an acetoacetoxy monomer (e.g., AAEM), or another functional monomer.

The aqueous compositions disclosed herein can be prepared by any polymerization method known in the art. In an embodiment of the presently claimed invention, the composition disclosed herein is prepared by a dispersion, a mini-emulsion, or an emulsion polymerization. For example, the aqueous compositions disclosed herein can be prepared by polymerizing a first and a second monomer in the presence of a solid grade oligomer using free-radical aqueous emulsion polymerization. The emulsion polymerization can be an aqueous emulsion comprising water, a first monomer, a second monomer, a solid grade oligomer, optionally an emulsifier, or combinations thereof. In an embodiment of the presently claimed invention, the polymerization medium is an aqueous medium. Solvents other than water can be used in the emulsion. The emulsion polymerization can be carried out either as a batch, semi-batch, or continuous process. In an embodiment, a portion of the monomers can be heated to the polymerization temperature and partially polymerized, and the remainder of the polymerization batch can be subsequently fed to the polymerization zone continuously, in steps or with superposition of a concentration gradient. The process can use a single reactor, or a series of reactors as would be readily understood by those skilled in the art. For example, a review of heterophase polymerization techniques is provided in M. Antonelli and K. Tauer, Macromol. Chem. Phys. 2003, vol. 204, p 207-19.

In an embodiment of the presently claimed invention, an aqueous dispersion is provided comprising the second polymer and the partially neutralized, acid-functional support resin. In another embodiment of the presently claimed invention, the aqueous dispersion can be prepared by first charging a reactor with water, a partially neutralized, acid-functional support resin, and optionally at least one surfactant. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, a reaction temperature between 50° C. and 100° C., for e.g., between 55° C. and 95° C., between 58° C. and 90° C., between 61° C. and 85° C., between 65° C. and 80° C., or between 68° C. and 75° C.

After the initial charge, a first monomer and a second monomer, and other monomers if desired, that are to be used in the polymerization of the second polymer can be continuously fed to the reactor in one or more monomer feed streams. The monomers can be supplied as a pre-emulsion in an aqueous medium, particularly if acrylate monomers are used in the polymerization. An initiator feed stream can be also continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period (e.g., 1.5-5 hours) to cause polymerization of the monomers and to thereby produce the copolymer dispersion. Optionally, a surfactant can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

The monomer feed stream can include one or more monomers. The first and the second monomers can be fed in one or more feed streams with each stream including one or more of the monomers being used in the polymerization process. For example, styrene and acrylonitrile (when used) and other monomers can be provided in separate monomer feed streams or can be added as a pre-emulsion. It can also be advantageous to delay the feed of certain monomers to provide certain polymer properties or to provide a layered or multiphase structure (e.g., a core/shell structure).

The molecular weight of the first and/or second polymers can be adjusted by adding a small amount of molecular weight regulators, for example, 0.01 wt. % to 4 wt. %, based on the monomers being polymerized. Regulators which can be used include but are not limited to organic thio compounds, for e.g., tert-dodecylmercaptan, allyl alcohols and aldehydes.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in Progress in Polymer Science 24, 1149-1204 (1999). Exemplary initiators include azo initiators and aqueous solutions of sodium persulfate. The initiator stream can optionally include one or more buffers or pH regulators.

In addition to the monomers and initiator, optionally, an anionic or non-ionic surfactant (i.e., emulsifier) can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor. The surfactant can be provided in an amount of 1 wt. % to 5 wt. %, based on the total weight of monomer and surfactant. In an embodiment of the presently claimed invention, the surfactant is provided in an amount less than 2 wt. %.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide, for e.g., t-butylhydroperoxide and a reducing agent, for e.g., sodium acetone bisulfite, or another redox pair to the reactor at an elevated temperature and for a predetermined period (e.g., 0.5 hours). Suitable redox pairs are described by A. S. Sarac in Progress in Polymer Science 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted, and a biocide or other additives can be added. Cationic, anionic, and/or amphoteric surfactants or polyelectrolytes may optionally be added after the stripping step or later if desired in the product to provide a cationic or anionic polymer dispersion.

Once the polymerization reaction is complete, and the stripping step is completed, the temperature of the reactor can be reduced.

In an embodiment of the presently claimed invention, the particles of the resultant polymer dispersion (the first polymer, the second polymer and/or mixtures thereof) have an volume-average particle size from 50 nm to 400 nm, for e.g., from 50 nm to 380 nm, from 50 nm to 360 nm, from 50 nm to 340 nm, from 50 nm to 320 nm, from 90 nm to 300 nm, from 120 nm to 380 nm, from 140 nm to 360 nm, from 160 nm to 340 nm, from 200 nm to 320 nm, or from 220 nm to 300 nm, or from 240 nm to 280 nm. In some embodiments, the particles of the resultant copolymer dispersion have a number average particle size of 50 nm to 300 nm for e.g., from 50 nm to 290 nm, from 50 nm to 280 nm, from 50 nm to 270 nm, from 50 nm to 260 nm, from 50 nm to 250 nm, from 50 nm to 240 nm, from 50 nm to 230 nm, from 50 nm to 220 nm, from 50 nm to 210 nm, from 50 nm to 200 nm, from 50 nm to 190 nm, or from 50 nm to 180 nm. The particle size measurements are made using dynamic light scattering measurements using a nanoflex particle sizer from Microtrac.

The aqueous composition can be produced as a dispersion that includes, as a disperse phase, particles of the copolymer dispersed in water. In an embodiment of the presently claimed invention, the aqueous composition can be prepared with a total solid content of from 20 wt. % to 70 wt. %, for e.g., 25 wt. % to 65 wt. %, 3 5 wt. % to 60 wt. %, or 40 wt. % to 50 wt. %. In another embodiment of the presently claimed invention, the aqueous composition can have a total solid content of 45 wt. % or greater that 45 wt. %. Despite the higher solid content of the aqueous dispersions, the aqueous dispersions disclosed herein can have a Brookfield viscosity of 100 cP to 2,500 cP, for e.g., from 100 cP to 1,500 cP or from 500 cP to 1,500 cP at 23° C. The viscosity can be measured using a viscometer with a #2 spindle at 50 rpm at 23° C.

The aqueous composition described herein may contain a wax. In an embodiment of the presently claimed invention, the wax is present in the aqueous composition in an amount of from 0 wt. % to about 25 wt. %, based on the total weight of the aqueous composition. For example the wax is present in the aqueous composition in an amount from 0 wt. % to about 20 wt. %; from 0 wt. % to about 15 wt. %; from 0 wt. % to about 10 wt. %; from 0 wt. % to about 5 wt. %; from about 1 wt. % to about 25 wt. %; about 1 wt. % to about 20 wt. %; from about 1 wt. % to about 15 wt. %; from about 1 wt. % to about 10 wt. %; from about 5 wt. % to about 25 wt. %; from about 5 wt. % to about 20 wt. %; from about 5 wt. % to about 15 wt. %; from about 5 wt. % to about 10 wt. %; from about 10 wt. % to about 25 wt. %; from about 10 wt. % to about 20 wt. %; from about 10 wt. % to about 15 wt. %. In an embodiment of the presently claimed invention, the wax is present in the aqueous composition in an amount of 0, 1, 2, 3, 4, 5, 6, 7, 8, 9, 10, 11, 12, 13, 14, 15, 16, 17, 18, 19, 20, 21, 22, 23, 24, or 25 wt. %, including increments therein. In an embodiment of the presently claimed invention, the wax is present in the multi-phase polymer binder in an amount of about 1, 2, 3, 4, 5, 6, 7, 8, 9, 10, 11, 12, 13, 14, 15, 16, 17, 18, 19, 20, 21, 22, 23, 24, or 25 wt. %, including increments therein.

In an embodiment of the presently claimed invention, the wax is an aqueous emulsion also referred herein as wax emulsion. In an embodiment of the presently claimed invention, the wax emulsion is at least 1 wt. % based on polymer solids. This includes 1, 2, 3, 4, 5, 6, 7, 8, 9, 10, 11, 12, 13, 14, 15, 16, 17, 18, 19, 20, 21, 22, 23, 24, or 25 wt. % based on polymer solids, including increments therein. In an embodiment of the presently claimed invention, the wax emulsion may have a solid content from about 15 wt. % to about 60 wt. %. In another embodiment of the presently claimed invention, the wax emulsion may have a solid content from about 25 wt. % to 40 wt. %. As a non-limiting illustration, for resin solutions having a solid content from about 15 wt. % to about 60 wt. %, the pH may range from about neutral to 9.5 and have a Brookfield viscosity from 35 cps to 6,000 cps.

In another embodiment of the presently claimed invention, the wax emulsion contains paraffin, polyethylene, polypropylene, microcrystalline waxes, fluorinated waxes, ethylene and propylene copolymer waxes, or any combination of two or more thereof. Illustrative hydrophobic emulsions include, but are not limited to, paraffin/polyethylene wax emulsions, anionic paraffin/polyethylene wax emulsions, paraffin wax emulsions, ethoxylated paraffin wax emulsions, and paraffin wax emulsions dispersed with a surfactant. Exemplary hydrophobic emulsions include, but are not limited to, JONCRYL® Wax 120, PETROLITE™ D-800, MICHEM® 62330, PETROLITE™ D-1038, JONCRYL® Wax 26, UNITHOX™ D-300, UNITHOX™ D-550 and UNITHOX™ 75.

The aqueous composition described herein may contain a surfactant. In an embodiment of the presently claimed invention, the surfactant is anionic or non-ionic. In an embodiment of the presently claimed invention, the surfactant is selected from the group consisting of alkyl sulfonates, alkyl benzene sulfonates, alkyl sulfates, alkyl benzene sulfates, phosphates, phosphinates, fatty carboxylates and mixtures thereof.

In another embodiment of the presently claimed invention, the surfactant contains at least one fatty alcohol alkoxylates. In another embodiment of the presently claimed invention, the at least one fatty alcohol alkoxylates are selected from fatty alcohol ethoxylates, fatty alcohol propoxylates, and any combination thereof. In yet another embodiment of the presently claimed invention, the surfactant contains at least one ethylene oxide/propylene oxide block copolymer. In another embodiment of the presently claimed invention, the surfactant contains at least one fatty alcohol ethoxylate. In yet another embodiment of the presently claimed invention, the surfactant contains at least one or more alkylsulfosuccinate ethoxylate. In another embodiment of the presently claimed invention, the surfactant comprises at least one alkylsulfosuccinate ethoxylate and at least one fatty alcohol ethoxylate. In yet another embodiment of the presently claimed invention, the surfactant contains at least one fatty alcohol having an alkyl chain length of about 12 to about 18 carbons; and a degree of ethoxylation of about 10 to about 80 molar ethylene oxide units. In another embodiment of the presently claimed invention, the surfactant includes non-ionic surfactants. In yet another embodiment of the presently claimed invention, the surfactant includes anionic surfactants. In another embodiment of the presently claimed invention, the anionic surfactant includes at least one alkyl sulfonate, alkyl benzene sulfonate, alkyl sulfate, alkyl benzene sulfate, phosphate, phosphinates, fatty carboxylates, or any combination of two or more thereof.

In yet another embodiment of the presently claimed invention, the surfactant is present in the aqueous composition in an amount from 0 wt. % to about 10 wt. %. This includes where the amount is from 0 wt. % to about 9 wt. %; from 0 wt. % to about 8 wt. %; from 0 wt. % to about 7 wt. %; from 0 wt. % to about 6 wt. %; from 0 wt. % to about 5 wt. %; from 0 wt. % to about 4 wt. %; from 0 wt. % to about 3 wt. %; from 0 wt. % to about 2 wt. %; from 0 wt. % to about 1 wt. %; about 1 wt. % to about 10 wt. %; about 1 wt. % to about 9 wt. %; about 1 wt. % to about 8 wt. %; about 1 wt. % to about 7 wt. %; about 1 wt. % to about 6 wt. %; about 1 wt. % to about 5 wt. %; about 1 wt. % to about 4 wt. %; about 1 wt. % to about 3 wt. %; about 1 wt. % to about 2 wt. %; about 2 wt. % to about 10 wt. %; about 2 wt. % to about 9 wt. %; about 2 wt. % to about 8 wt. %; about 2 wt. % to about 7 wt. %; about 2 wt. % to about 6 wt. %; about 2 wt. % to about 5 wt. %; about 2 wt. % to about 4 wt.

%; about 2 wt. % to about 3 wt. %; about 3 wt. % to about 10 wt. %; about 3 wt. % to about 9 wt. %; about 3 wt. % to about 8 wt. %; about 3 wt. % to about 7 wt. %; about 3 wt. % to about 6 wt. %; about 3 wt. % to about 5 wt. %; about 3 wt. % to about 4 wt. %; about 5 wt. % to about 10 wt. %; about 5 wt. % to about 9 wt. %; about 5 wt. % to about 8 wt. %; about 5 wt. % to about 7 wt. %; or about 5 wt. % to about 6 wt. %. In another embodiment of the presently claimed invention, the surfactant is present in the multi-phase polymer binder in an amount from 0, 1, 2, 3, 4, 5, 6, 7, 8, 9, or 10 wt. %, including increments therein. In yet another embodiment of the presently claimed invention, the surfactant is present in the multi-phase polymer binder in an amount of about 1, 2, 3, 4, 5, 6, 7, 8, 9, or 10 wt. %, including increments therein.

The resins solution may have a solid content from about 15 wt. % to about 60 wt. %, with a pH of from 7.0 to 9.5, and a Brookfield viscosity from 35 cps to 6,000 cps. This may include a solid content from about 30 wt. % to about 50 wt. %, with a pH of from 8.0 to 9.0, and a Brookfield viscosity from 100 cps to 1,000 cps.

The aqueous compositions described herein may contain other materials such as, but are not limited to, additives, pigments, other aqueous resin solutions, rheology modifiers, wetting agents, defoamers, and fillers. Illustrative examples of pigments include but are not limited to clay, organic pigments, inorganic pigments. Illustrative other aqueous resin solutions include carboxylic acid-rich copolymers that may be incorporated from 0 wt. % to about 20 wt. % or from >0 to about 20 wt. %. Such carboxylic acid-rich copolymers may include copolymers of carboxylic acid functional monomers, styrene, and (meth)acrylate monomers. For example, the carboxylic acid-rich copolymers may include from 5 wt. % to 25 wt. % carboxylic acid functional monomers, up to about 70 wt. % styrene, and from 10 wt. % to 90 wt. % (meth)acrylate monomers. Illustrative rheology modifiers include, but are not limited to, hydrophobically modified ethoxylated urethanes, hydrophobically modified polyethers, alkali swellable emulsions; hydrophobically modified alkali swellable emulsions, clays, and fumed silica. The rheology modifiers may be used in the formulations from 0 wt. % to about 2 wt. % or from >0 wt. % to about 2 wt. %. Illustrative wetting agents include but are not limited to alkoxylated surfactants (i.e. di-functional block copolymer surfactants terminating in primary hydroxyl groups or polyethylene glycol and/or propylene glycols) silicone surfactants, sulfosuccinate surfactants, and star shaped alkoxylated polymers. The wetting agents may be used in the formulations from 0 wt. % to about 4 wt. % or from >0 wt. % to about 4 wt. %. Illustrative defoamers include but are not limited to oil-based defoamers (i.e. mineral oil, vegetable oil, or white oils), silicon-based defoamers (i.e. polydimethylsiloxane and derivatives thereof), aqueous emulsion based defoamers, aqueous defoamer emulsions based on oils, polymers and organo-modified silicones, polyethylene glycol and/or propylene glycols, and star shaped polymers. The defoamers may be used in the formulations from 0 wt. % to about 0.5 wt. % or from >0 wt. % to about 0.5 wt. %. Illustrative fillers include but are not limited fumed silica, clay materials i.e. exfoliated or non-exfoliated kaolins, talc, attapulgites, montmorillonite, bentonite, hectorite and saponite; calcium carbonate, natural mica, and combinations of any two or more thereof. The fillers may be used in the formulations from 0 wt. % to about 40 wt. % or from >0 wt. % to about 40 wt. %.

When coated on a substrate and dried, the aqueous compositions described herein provide a water uptake of less than about 5 g/m$^2$/20 minutes (min). For flexographic coatings, water uptake of less than about 16 g/m$^2$. This includes a water uptake of less than about 4.5 g/m$^2$/20 min, a water uptake of less than about 4 g/m$^2$/20 min, a water uptake of less than about 3.5 g/m$^2$/20 min, a water uptake of less than about 3 g/m$^2$/20 min, a water uptake of less than about 2.5 s g/m$^2$/20 min, a water uptake of less than about 2 g/m$^2$/20 min, or a water uptake of less than about 1 g/m$^2$/20 min. In some embodiments, the water uptake is about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 g/m$^2$/20 min, including increments therein. In some embodiments, the water uptake is from about 0.5 to about 5.0 g/m$^2$/20 min. This includes a water uptake of from about 0.5 to about 4.5 g/m$^2$/20 min, from about 0.5 to about 4.0 g/m$^2$/20 min, from about 0.5 to about 3.5 g/m$^2$/20 min, from about 0.5 to about 3.0 g/m$^2$/20 min, from about 0.5 to about 2.5 g/m$^2$/20 min, from about 0.5 to about 2.0 g/m$^2$/20 min, from about 1.0 to about 5.0 g/m$^2$/20 min, from about 1.0 to about 4.5 g/m$^2$/20 min, from about 1.0 to about 4.0 g/m$^2$/20 min, from about 1.0 to about 3.5 g/m$^2$/20 min, from about 1.0 to about 3.0 g/m$^2$/20 min, or from about 1.0 to about 2.5 g/m$^2$/20 min.

An aspect of presently claimed invention is directed to a substrate comprising at least one surface coated with at least one layer comprising an aqueous composition disclosed herein. In an embodiment of the presently claimed invention, the substrate is paper or paperboard.

The aqueous compositions disclosed herein can be used with any substrate to impart water, moisture, grease, oil, and/or oxygen resistance. In an embodiment of the presently claimed invention, the substrate can be a cellulose-based substrate, such as paper, paper board, or cardboard. The cellulose-based substrates can include paper cups, including for instance, disposable or recyclable paper cups, paper bags for dry foods, such as, for example, coffee, tea, soup powders, sauce powders; for liquids, such as, for example, cosmetics, cleaning agents, beverages; of tube laminates; of paper carrier bags; of paper laminates and co-extrudates for ice cream, confectionery (e.g., chocolate bars and muesli bars), of paper adhesive tape; of cardboard cups (e.g., paper cups), yogurt pots, souffle cups; of meal trays, or meat trays; of wound cardboard containers (e.g., cans, drums), of wet-strength cartons for outer packaging (e.g., wine bottles, food); of fruit boxes of coated cardboard; of fast food plates; of clamp shells; of beverage cartons and cartons for liquids, such as detergents and cleaning agents, frozen food cartons, ice packaging (e.g., ice cups, wrapping material for conical ice cream wafers); of paper labels; or of flower pots and plant pots.

Another aspect of the presently claimed invention is directed to a coated paper or an article comprising the aqueous composition disclosed herein. In an embodiment of presently claimed invention, the coated paper or an article comprising the aqueous composition disclosed herein has a coating weight in the range of from about 2 g/m$^2$ to about 30 g/m$^2$ of the coated paper. In an embodiment of presently claimed invention, the coated paper or an article comprising the aqueous composition disclosed herein has a coating weight in the range of from about 10 g/m$^2$ to about 25 g/m$^2$ of the coated paper. In another embodiment of the presently claimed invention, the coated paper has a block resistance of 3 or greater for 24 hours at 60° C. and 60 psi determined according to ASTM WK20008. In another embodiment of the presently claimed invention, the coated paper has a block resistance of 4 or greater for 24 hours at 60° C. and 60 psi determined according to ASTM WK20008. In a yet another embodiment of the presently claimed invention, the paper exhibits oil and/or grease resistant properties.

Another aspect of the presently claimed invention is directed to a method of making paper comprising at least the step of contacting a cellulosic fiber with an aqueous composition disclosed herein. In an embodiment of the presently claimed invention, the step of contacting the cellulosic fiber with the aqueous composition comprises coating a paper web comprising a cellulosic fiber with an aqueous dispersion comprising the aqueous composition. In another embodiment of the presently claimed invention, contacting the cellulosic fiber with the aqueous composition disclosed herein comprises (i) mixing an aqueous dispersion comprising the aqueous composition with the cellulosic fibers to form a slurry; and (ii) forming a paper web from the slurry of the cellulosic fibers and the aqueous composition.

In another embodiment of the presently claimed invention, the aqueous composition is coated on the substrate. For example, the aqueous composition can be provided as a coating on a paper web. The aqueous composition can have a coating weight of 2 $g/m^2$ or greater, for e.g., 3 $g/m^2$ or greater, 4 $g/m^2$ or greater, 5 $g/m^2$ or greater, 6 $g/m^2$ or greater, 7 $g/m^2$ or greater, 8 $g/m^2$ or greater, 9 $g/m^2$ or greater, 10 $g/m^2$ or greater, 11 $g/m^2$ or greater, 12 $g/m^2$ or greater, 13 $g/m^2$ or greater, 14 $g/m^2$ or greater, 15 $g/m^2$ or greater, 16 $g/m^2$ or greater, 17 $g/m^2$ or greater, 18 $g/m^2$ or greater, 19 $g/m^2$ or greater, 20 $g/m^2$ or greater, 21 $g/m^2$ or greater, 22 $g/m^2$ or greater, 23 $g/m^2$ or greater, 24 $g/m^2$ or greater, 25 $g/m^2$ or greater, 26 $g/m^2$ or greater, 27 $g/m^2$ or greater, 28 $g/m^2$ or greater, or 29 $g/m^2$ or greater. In an embodiment of the presently claimed invention, the aqueous composition can have a coating weight of 30 $g/m^2$ or less, for e.g., 29 $g/m^2$ or less, 28 $g/m^2$ or less, 27 $g/m^2$ or less, 26 $g/m^2$ or less, 25 $g/m^2$ or less, 24 $g/m^2$ or less, 23 $g/m^2$ or less, 22 $g/m^2$ or less, 21 $g/m^2$ or less, 20 $g/m^2$ or less, 19 $g/m^2$ or less, 18 $g/m^2$ or less, 17 $g/m^2$ or less, 16 $g/m^2$ or less, 15 $g/m^2$ or less, 14 $g/m^2$ or less, 13 $g/m^2$ or less, 12 $g/m^2$ or less, 11 $g/m^2$ or less, 10 $g/m^2$ or less, 9 $g/m^2$ or less, 8 $g/m^2$ or less, 7 $g/m^2$ or less, 6 $g/m^2$ or less, 5 $g/m^2$ or less, 4 $g/m^2$ or less, or 3 $g/m^2$ or less. In yet another embodiment of the presently claimed invention, the aqueous composition can have a coating weight of from 2 $g/m^2$ to 30 $g/m^2$, for e.g., 3 $g/m^2$ to 30 $g/m^2$, 4 $g/m^2$ to 30 $g/m^2$, 5 $g/m^2$ to 30 $g/m^2$, or 10 $g/m^2$ to 25 $g/m^2$. The coating weight can be reported in units of grams of coating per square meter of cellulose-based substrate and can be calculated directly by the amount of coating applied and the surface area of the cellulose-based substrate that the coating is applied to. In an embodiment of the presently claimed invention, the aqueous-composition can be applied in an amount of less than 15 wt. % based on the weight of the coated cellulose-based substrate. In some embodiments, the aqueous composition can be from 0.01 wt. % to 5 wt. %, for e.g., from 0.1 wt. % to 5 wt. %, from 0.5 wt,% to 5 wt. %, from 0.1 wt. % to 4 wt. %, from 0.1 wt. % to 3 wt. %, from 0.1 wt. % to 20.5 wt. %, or 0.1 wt. % or greater, 0.5 wt. % or greater, 1 wt. % or greater, 1.5 wt. % or greater, by weight of the substrate.

In an embodiment of the presently claimed invention, the aqueous composition can have a thickness of from 0.40 mils or greater, for e.g., 0.5 mils or greater, 0.6 mils or greater, 0.7 mils or greater, 0.8 mils or greater, 0.9 mils or greater, 1 mils or greater, 1.1 mils or greater, 1.2 mils or greater, 1.3 mils or greater, 1.4 mils or greater, 1.5 mils or greater, 1.6 mils or greater, 1.7 mils or greater, 1.8 mils or greater, 1.9 or greater. In an embodiment of the presently claimed invention, the aqueous composition can have a thickness of 2 mils or less, for e.g., 1.9 mils or less, 1.8 mils or less, 1.7 mils or less, 1.6 mils or less, 1.5 mils or less, 1.4 mils or less, 1.3 mils or less, 1.2 mils or less, 1 mils or less, 0.9 mils or less, 0.8 mils or less, 0.7 mils or less, 0.6 mils or less, or 0.5 mils or less. The aqueous composition can have, in some embodiments, a thickness of from 0.4 mils to 2 mils, for e.g., from 0.5 mils to less than 1.8 mils, from 0.6 mils to 1.6 mils, or from 0.7 mils to 1.5 mils. The coating thickness can be calculated based on the density of the coating and the weight of the coated cellulose-based substrate.

In an embodiment of the presently claimed invention, a coating is provided with the aqueous composition. In another embodiment of the presently claimed invention, the coating can be on one or more surfaces of the substrate. For purposes of the presently claimed invention, the substrate also refers to paper cups or paper bags. The paper cup can have an interior surface, an exterior surface, a bottom portion, and a side portion. The aqueous composition can be on a first surface and/or a second surface of the paper cup. The first surface may comprise one or more of an interior surface of the side portion and/or an interior surface of the bottom portion. In some embodiments, only a portion, for e.g., 10% or greater, 20% or greater, 30% or greater, 40% or greater, 50% or greater, 60% or greater, 70% or greater, 80% or greater, 90% or greater, or all of the interior surface is coated. In an embodiment of the presently claimed invention, the entire interior surface is coated. In an embodiment of the presently claimed invention, the second surface, comprises one or more of an exterior surface of the side portion and/or an exterior surface of the bottom portion. In another embodiment of the presently claimed invention, only a portion, for e.g., 10% or greater, 20% or greater, 30% or greater, 40% or greater, 50% or greater, 60% or greater, 70% or greater, 80% or greater, 90% or greater, or all of the exterior surface is coated. In yet another embodiment of the presently claimed invention, the entire exterior surface is coated.

The aqueous composition can be coated onto a cellulose-based substrate using a paper machine in a mill or by a printing method.

In an embodiment of the presently claimed invention, the aqueous composition is provided throughout the substrate, for example, a paper web formed of cellulosic fibers. In yet another embodiment of the presently claimed invention, the aqueous composition can be from 4 wt. % to 30 wt. % by weight of the substrate, for e.g., from 5 wt. % to 30 wt. %, from 5 wt. % to 29 wt. %, from 5 wt. % to 28 wt. %, from 5 wt. % to 27 wt. %, from 5 wt. % to 26 wt. %, from 5 wt. % to 20 wt. %, or 4 wt. % or greater, 5 wt. % or greater, 6 wt. % or greater, 7 wt. % or greater, 8 wt. % or greater, 9 wt. % or greater, or 10 wt. % or greater, in each case based on the weight of the substrate.

The aqueous composition can be added to a substrate, such as a cellulose-based substrate using any method known in the art for adding the aqueous composition to a substrate. In an embodiment of the presently claimed invention, the method can include coating a paper web comprising cellulosic fibers with an aqueous dispersion comprising the aqueous composition. In another embodiment of the presently claimed invention, the method can include spraying an aqueous dispersion comprising the aqueous composition on a paper web. In yet another embodiment of the presently claimed invention, the method can include mixing an aqueous dispersion comprising the aqueous composition with an aqueous slurry comprising the cellulosic fibers to form a mixture and forming a paper web form the mixture of the cellulosic fibers and the aqueous composition.

In an embodiment of the presently claimed invention, the aqueous composition can impart water, moisture, grease, oil, and/or oxygen resistance to the substrate compared to applications that do not include the aqueous composition. The substrates may also exhibit reduced or eliminated leaks or staining. Liquid-water and water-vapor resistance of a substrate comprising the aqueous composition can be tested with the Cobb method, described by TAPPI T 441 (2001), which is incorporated by reference herein in its entirety. This method determines the amount of liquid water or moisture vapor absorbed by paper, paperboard, and corrugated fiberboard in a specified time under standardized conditions. In an embodiment of the presently claimed invention, the coated substrates described herein would pass the water-resistance test set forth in this test method. Water absorptiveness can be a function of various characteristics of paper or paperboard including, but are not limited to, sizing and porosity.

In an embodiment of the presently claimed invention, the substrate comprising the aqueous composition can exhibit a Cobb value of about 0.01 $g/m^2$ at 20 minutes to 25 $g/m^2$ at 20 minutes, for e.g., 25 $g/m^2$ or less, 20 $g/m^2$ or less, 15 $g/m^2$ or less, 10 $g/m^2$ or less, or 5 $g/m^2$ or less. The substrate comprising the aqueous composition can exhibit a moisture vapor transmission rate (MVTR) of 35 $g/m^2$ or less for 24 hours when measured at 25° C. and 50 RH %. For example, the substrate comprising the aqueous composition can exhibit a moisture vapor transmission rate of 32 $g/m^2$ or less, 30 $g/m^2$ or less, 27 $g/m^2$ or less, 25 $g/m^2$ or less, 22 $g/m^2$ or less, 20 $g/m^2$ or less, 18 $g/m^2$ or less, 17 $g/m^2$ or less, or 15 $g/m^2$ or less. In yet another embodiment of the presently claimed invention, the substrate comprising the aqueous composition can exhibit a moisture vapor transmission rate of 5 $g/m^2$ or greater or 10 $g/m^2$ or greater.

Further, the substrate comprising the aqueous composition described herein may exhibit minimal tendencies of blocking, i.e., the adhesion of the coated surface to another coated surface, or the adhesion of the coated surface to an uncoated surface of the extrusion coated paper when wound onto paper rolls, before cutting/forming into finished paper products. Blocking resistance can be tested using the I.C. Block tester, described by ASTM WK20008. Samples can be given a rating of 1 to 5, based on the following scale: 1-very light tack, 2-light tack, 3-heavy tack, 4-sticky, about 25% fiber tear, and 5-more than 25% fiber tear. For purposes of the presently claimed invention, sufficient block resistance refers to a rating of 5 according to the rating system described in the instant Examples. For purposes of the presently claimed invention, presence of substrate damage is assessed by the naked eye. For purposes of the presently claimed invention, "no substrate damage" refers to no substrate damage as observed by the naked eye.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Embodiments

In the following, there is provided a list of embodiments to further illustrate the present disclosure without intending to limit the disclosure to the specific embodiments listed below.

Embodiment 1: An aqueous composition comprising:
(i) at least one first polymer in an amount in the range of from about 10 wt. % to about 90 wt. % derived from at least one first monomer selected from ethylenically substituted aromatic compounds and at least one second monomer selected from the group consisting of as (meth)acrylonitrile, (meth)acrylamide, (meth)acrylic acid, alkyl (meth)acrylates and mixtures thereof; and
(ii) at least one second polymer in an amount in the range of from about 10 wt. % to about 90 wt. % comprising the reaction product of a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof; and wherein the wt. % in each case is based on the total weight of the aqueous composition.

Embodiment 2: The aqueous composition according to embodiment 1, the ratio of volume average particle size of the at least one first polymer to the average particle size of the at least one second polymer is in the range of from about 20:1 to about 2:1.

Embodiment 3: The aqueous composition according to embodiment 1, wherein the viscosity of the aqueous composition is in the range of from about 100 cP to about 2500 cP, measured using a viscometer with a #2 spindle at 50 rpm at 23° C.

Embodiment 4: The aqueous composition according to embodiment 1, wherein the solid content of the aqueous composition is in the range of from about 20 wt. % to about 70 wt. %, based on the total weight of the aqueous composition.

Embodiment 5: The aqueous composition according to embodiment 1, wherein the weight average molecular weight of the first polymer is in the range of from about 20 kDa to about 500 kDa determined according to gel permeation chromatography.

Embodiment 6: The aqueous composition according to embodiment 1, wherein the volume average particle size diameter of the first polymer is in the range of from about 90 nm to about 400 nm, determined by dynamic light scattering technique.

Embodiment 7: The aqueous composition according to embodiment 1, wherein the viscosity of the first polymer is in the range of from about 100 cP to about 2500 cP, measured using a viscometer with a #2 spindle at 50 rpm at 23° C.

Embodiment 8: The aqueous composition according to embodiment 1, wherein the at least one first monomer is different from the at least one second monomer.

Embodiment 9: The aqueous composition according to embodiment 8, wherein the ethylenically substituted aromatic compound is selected from the group consisting of styrene, methylstyrene, butylstyrene, decylstyrene, vinyltoluene, indene, methylindenes and mixtures thereof.

Embodiment 10: The aqueous composition according to any of the embodiments 1 to 9, wherein the amount of the first monomer is in the range of from about 10 wt. % to about 50 wt. % and the amount of the second monomer is in the range of from about 10 wt. % to about 90 wt. %, in each case based on the total weight of the first polymer.

Embodiment 11: The aqueous composition according to any of the embodiments 1 to 10, wherein the amount of the first monomer of the first polymer is in the range of from about 10 wt. % to about 40 wt. % and the amount of the second monomer of the first polymer is in the range of from about 20 wt. % to about 90 wt. %, in each case based on the total weight of the first polymer.

Embodiment 12: The aqueous composition according to any of the embodiments 1 to 11, wherein the amount of the at least one first monomer of the first polymer is in the range of from about 10 wt. % to about 30 wt. % and the amount of the at least one second monomer of the first polymer is in the range of from about 70 wt. % to about 90 wt. %, in each case based on the total weight of the first polymer.

Embodiment 13: The aqueous composition according to embodiment 1, wherein the partially neutralized, acid-functional support resin of the second polymer is selected from the group consisting of ammonium salt of a modified acrylic copolymer, an amine salt of a modified acrylic copolymer and mixtures thereof.

Embodiment 14: The aqueous composition according to embodiment 13, wherein the modified acrylic copolymer is derived from the group consisting of (meth) acrylic acid monomers, (meth) acrylate monomers, vinyl aromatic monomers and mixtures thereof.

Embodiment 15: The aqueous composition according to embodiment 1, wherein the weight average molecular weight of the second polymer is in the range of from about 100 kDa to about 1000 kDa determined according to gel permeation chromatography.

Embodiment 16: The aqueous composition according to embodiment 1, wherein the volume average particle size diameter of the second polymer is in the range of from about 50 nm to about 200 nm, determined by light scattering technique.

Embodiment 17: The aqueous composition according to embodiment 1, wherein the viscosity of the second polymer is in the range of from about 1000 cP to about 5000 cP. measured using a viscometer with a #2 spindle at 50 rpm at 23° C.

Embodiment 18: The aqueous composition according to embodiment 1, wherein the weight average molecular weight of the partially neutralized, acid-functional support resin is in the range of from about 2 kDa to about 20 kDa determined according to gel permeation chromatography.

Embodiment 19: The aqueous composition according to embodiment 1, wherein the partially neutralized, acid-functional support resin is neutralized with a base selected from the group consisting of ammonia, sodium hydroxide, potassium hydroxide, organic amine and mixtures thereof.

Embodiment 20: The aqueous composition according to embodiment 1, wherein partially neutralized refers to neutralization of at least about 5 mol % of acid groups on the acid-functional support resin with a base.

Embodiment 21: The aqueous composition according to any of the embodiments 1 to 20, wherein the second polymer comprises a partially neutralized, acid-functional support resin in an amount of about 10 wt. % to about 50 wt. % and at least one ethylenically-unsaturated monomer in an amount in the range of from about 5 wt. % to about 90 wt. %, in each case based on the total weight of the second polymer.

Embodiment 22: The aqueous composition according to any of the embodiments 1 to 21, wherein the second polymer comprises a partially neutralized, acid-functional support resin in an amount of about 10 wt. % to about 40 wt. % and at least one ethylenically-unsaturated monomer in an amount in the range of from about 20 wt. % to about 90 wt. %, in each case based on the total weight of the second polymer.

Embodiment 23: The aqueous composition according to any of the embodiments 1 to 22, wherein the second polymer comprises a partially neutralized, acid-functional support resin in an amount of about 10 wt. % to about 30 wt. % and at least one ethylenically-unsaturated monomer in an amount in the range of from about 70 wt. % to about 90 wt. %, in each case based on the total weight of the second polymer.

Embodiment 24: The aqueous composition according to embodiment 1, further comprising a wax in an amount in the range of from about 0.10 wt. % to about 25 wt. % based on the total weight of the aqueous composition.

Embodiment 25: The aqueous composition according to embodiment 24, wherein the wax is an aqueous emulsion.

Embodiment 26: The aqueous composition according to embodiment 25, wherein the aqueous emulsion is selected from the group consisting of paraffins, polyethylene, polypropylene, microcrystalline waxes, fluorinated waxes, ethylene copolymer waxes, propylene copolymer waxes and mixtures thereof.

Embodiment 27: The aqueous composition according to any of the embodiments 1 to 26, further comprising a surfactant.

Embodiment 28: The aqueous composition according to embodiment 27, wherein the surfactant is anionic or non-ionic.

Embodiment 29: The aqueous composition according to embodiment 28, wherein the surfactant is selected from the group consisting of alkyl sulfonates, alkyl benzene sulfonates, alkyl sulfates, alkyl benzene sulfates, phosphates, phosphinates, fatty carboxylates and mixtures thereof.

Embodiment 30: The aqueous composition according to embodiment 28, wherein the surfactant comprises at least one fatty alcohol ethoxylate.

Embodiment 31: The aqueous composition according to embodiment 28, wherein the surfactant comprises at least one alkylsulfosuccinate ethoxylate.

Embodiment 32: The aqueous composition according to embodiment 28, wherein the surfactant comprises at least one alkylsulfosuccinate ethoxylate and at least one fatty alcohol ethoxylate.

Embodiment 33: The aqueous composition according to embodiment 28. wherein the surfactant comprises at least one fatty alcohol having an alkyl chain length of about 12 carbons to about 18 carbons and a degree of ethoxylation of about 10 molar ethylene oxide units to about 80 molar ethylene oxide units.

Embodiment 34: A substrate comprising at least one surface coated with at least one layer comprising an aqueous composition according to any of the embodiments 1 to 32.

Embodiment 35: The substrate according to embodiment 34, wherein the substrate is paper or paperboard.

Embodiment 36: A coated paper or an article comprising the aqueous composition according to any of the embodiments 1 to 33.

Embodiment 37: The coated paper or the article according to embodiment 36, wherein the aqueous composition has a coating weight in the range of from about 2 g/m² to about 30 g/m² of the coated paper.

Embodiment 38: The coated paper according to embodiment 37, wherein the coated paper has a block resistance of 3 or greater for 24 hours at 60° C. and 60 psi determined according to ASTM WK20008.

Embodiment 39: The coated paper according to embodiment 36, wherein the paper exhibits oil and/or grease resistant properties.

Embodiment 40: A method of making paper comprising at least the step of contacting a cellulosic fiber with an aqueous composition according to any of the embodiments 1 to 33.

Embodiment 41: The method according to embodiment 40, wherein the step of contacting the cellulosic fiber with the aqueous composition comprises coating a paper web comprising a cellulosic fiber with an aqueous dispersion comprising the aqueous composition.

Embodiment 42: The method according to embodiment 40, wherein contacting the cellulosic fiber with the aqueous composition comprises (i) mixing an aqueous dispersion comprising the aqueous composition with the cellulosic fibers to form a slurry; and (ii) forming a paper web from the slurry of the cellulosic fibers and the aqueous composition.

While the presently claimed invention has been described in terms of its specific embodiments, certain modifications and equivalents will be apparent to those skilled in the art and are intended to be included within the scope of the presently claimed invention.

The presently claimed invention is associated with at least one of the following advantages:

i) The presently claimed invention provides good barrier properties and block resistance to paper or paperboard substrate coated with the composition disclosed herein.

ii) The presently claimed invention provides improved oil and grease resistance to paper or paperboard substrate coated with the composition disclosed herein.

iii) The presently claimed invention provides grease resistance from a temperature of about room temperature to about 60° C. to paper or paperboard substrate coated with the composition disclosed herein.

iv) The presently claimed invention provides improved temperature crease and fold grease resistance properties to paper or paperboard substrate coated with the composition disclosed herein.

v) The paper or paperboard substrate coated with the composition of the presently claimed invention is repulpable and recyclable.

vi) The presently claimed invention provides better packing during film formation to achieve the better grease resistance while also maintaining the block resistance.

vii) The aqueous composition of the presently claimed invention provides high solid content at low viscosity that is required for printing and thereby provides ease of printing.

EXAMPLES

Aspects of the presently claimed invention are more fully illustrated by the following examples, which are set forth to illustrate certain aspects of the present invention and are not to be construed as limiting thereof.

Components:

The monomers abbreviations that were used in the aqueous compositions are as follows:

AA is an abbreviation for acrylic acid obtained from Aldrich Chemical Company;

BA is an abbreviation for butyl acrylate obtained from Aldrich Chemical Company;

MAA is an abbreviation for methacrylic acid obtained from Aldrich Chemical Company;

MMA is an abbreviation for methyl methacrylate obtained from Aldrich Chemical Company;

AMS is alpha-methylstyrene obtained from Aldrich Chemical Company;

2-EHA is an abbreviation for 2-ethylhexylacrylate obtained from Aldrich Chemical Company;

HEA is an abbreviation for hydroxyethylacrylate obtained from Aldrich Chemical Company;

STY is an abbreviation for styrene obtained from Aldrich Chemical Company;

APS is an abbreviation for ammonium persulfate obtained from Aldrich Chemical Company; and tBHP is an abbreviation for tert-butylhydroperoxide obtained from Aldrich Chemical Company.

Joncryl® Wax 28 is a paraffin/polyethylene wax emulsion, obtained from BASF.

FoamStar® SI 2240 is a silicone based defoamer compound with a broad compatibility, obtained from BASF.

Sterocoll® FS is a thickener based on an aqueous dispersion of an acrylic copolymer, obtained from BASF.

Example 1A: Polymeric Resins Comprising the Second Polymer Synthesized Via Continuous High Temperature Polymerization Process and Preparation of Aqueous Resin Dispersions Polymers suitable for use in this invention may be prepared via addition polymerization in homogenous or heterogeneous media. Therefore, common techniques such as bulk polymerization, solution polymerization, emulsion polymerization, etc. can be used to generate suitable polymers according to this invention.

Table 1 summarizes the composition of the polymers used in this invention. These polymers were made a continuous free radical polymerization process at relatively high temperatures. Here, the polymerization takes place in a homogenous environment. High reaction temperatures allow achieving low molecular weights without the use of chain transfer agents. After the polymerization step, the resin is subjected to a devolatilizer to remove unreacted monomers and process solvents. Note that for the polymers presented in Table 1 were prepared via a high temperature, continuous polymerization process as described in U.S. Pat. Nos. 5,461,60; 4,414,370; and 4,529,787, all of which are incorporated herein by reference.

TABLE 1

Synthesis of the polymeric resins comprising the second polymer via continuous polymerization process

| Polymer | Polymer composition (wt. %) | Acid Number (mg KOH/g) | Tg (° C.) | Mn (kDa) | Mw (kDa) | PDI |
|---|---|---|---|---|---|---|
| P1 | 49 MMA/27 Sty/14 BA/10 AA | 77 | 75 | 5.1 | 15.8 | 3.1 |
| P2 | 18 AMS/40 Sty/10 2-EHA/32 AA | 222 | 133 | 2.3 | 5.8 | — |
| P3 | 30 AMS/33 Sty/6 2-EHA/31 AA | 227 | 141 | 3.4 | 9.75 | — |
| P4 | 36 AMS/21 Sty/7 2- | 243 | 126 | 1.1 | 1.9 | — |

TABLE 1-continued

Synthesis of the polymeric resins comprising the second polymer via continuous polymerization process

| Polymer | Polymer composition (wt. %) | Acid Number (mg KOH/g) | Tg (° C.) | Mn (kDa) | Mw (kDa) | PDI |
|---|---|---|---|---|---|---|
| | EHA/36 AA | | | | | |

Example 1B: Synthesis of Aqueous Resin Dispersions Comprising the Second Polymer The acid functional polymers described in Table 1 were dispersed in water by neutralizing a fraction of their acid groups with a base under agitation and heat. For example, a dispersion of P3 at 28.5 wt. % solids were prepared by adding 220 grams of P3 and 473.7 grams deionized water and 50.3 grams ammonia (29 wt. % active) to a reaction vessel equipped with a condenser and an overhead stirrer. This mixture was heated to 88° C.-92° C. under agitation and kept for 4 hours after which it was cooled down to room temperature and filtered yielding PD3.

Table 2 describes the polymer dispersions prepared this way. It is possible to make dispersions that contain more than one acid functional polymer with this methodology by starting from mixture of those polymers. This way particles are formed that contain both starting resins.

TABLE 2

Aqueous resin dispersions made from the polymeric resins comprising the second polymer synthesized via continuous polymerization process in Table 1

| Dispersion | Resin Composition | Solids | pH | Viscosity cPs | Volume average diameter $d_v$ (nm) |
|---|---|---|---|---|---|
| PD1 | P1 | 28.0 | 7.8 | <300 | <20 |
| PD2 | P2 | 34.2 | 8.5 | 3600 | <10 |
| PD3 | P3 | 28.5 | 8.0 | 200 | <10 |
| PD4 | P4 | 40.0 | 8.3 | 280 | <10 |

Example 2: Synthesis of Rheology Controlled Acrylic Emulsion Polymer Comprising the Second Polymer and the Partially Neutralized, Acid-Functional Support Resin To a reaction vessel equipped with a condenser, thermometer, nitrogen inlet, and an overhead stirrer, deionized water (31.1 grams) and resin support dispersion from Example 1B (PD3, 93.4 grams, 28.5% solids) were added and heated to 82° C. under a stream of nitrogen. Ammonium persulfate (0.66 grams) and deionized water (51.2 grams) were added and held for 3 minutes with agitation. The monomer mixture (methyl methacrylate 17 grams, butylacrylate 38.8 grams, and 2-ethylhexyl acrylate 24.9 grams) was added over 90 minutes followed by a 1.3 grams of deionized water flush and was held for 30 minutes. Tertiary-butylhydroperoxide (0.4 grams) and deionized water (2.38 grams) were added and held for 10 minutes. Sodium erythorbate (1.4 grams) and deionized water (3.2 grams) were added over 15 minutes and held for ten minutes. The reaction mass was cooled to ambient temperature and filtered. The desired resin fortified emulsion polymer is obtained with the following properties: viscosity at 25° C. is 1800 cps measured by a Brookfield LV, spindle #3 at 30 rpm, 30 seconds; solids are 48 wt. %; Tg=−27 C; MFFT=<5 C; acid number=64 mg KOH/gram; particle size (volume average diameter, dv)=81 nm; and Mw=826 kDa.

Example 3: Synthesis of a Dispersion Comprising the First Polymer

To a reaction vessel equipped with a condenser, thermometer, nitrogen inlet, and an overhead stirrer, deionized water (217.9 grams), polystyrene (7.6 grams, Aldrich Chemical Company) and DSI (14.53 grams) were added and heated to 90° C. under a stream of nitrogen. Sodium persulfate (6.9 grams, Aldrich Chemical Company) was added and held for 3 minutes with agitation. The monomer mixture (acrylic acid, Aldrich Chemical Company, 14.2 grams; acrylonitrile, Aldrich Chemical Company, 68.54 grams; n-butyl acrylate, Aldrich Chemical Company, 338.8 grams; and styrene, Aldrich Chemical Company, 68.54 grams) was added over 180 minutes while simultaneously adding sodium persulfate (42.1 grams) and the mixture (TSPP 45 grams, Disponil SDS 15 7.83 grams, and deionized water 121.7 grams) over 240 minutes. At the end of the feeds, tertiary-butylhydroperoxide (10.77 grams) and sodium metabisulfite (10.77 grams) were added and held for 10 minutes. After distillation of residual unreacted monomers, the reaction mass was cooled to ambient temperature and filtered. The desired waterborne acrylic dispersion polymer was obtained with the following properties: viscosity at 23° C. is 534 cps measured by a Brookfield RV, spindle #2 at 20 rpm; solids are 50 wt. %; Tg=−8 C; MFFT=<−2 C; particle size (volume average diameter, dv)=170 nm; and Mw=122 kDa.

Example 4: Packaging Coating Formulation

A coating composition was prepared by adding in sequential order with agitation: Example 2 (71.82 grams), resin dispersion PD2 (15.66 grams), Joncryl Wax 28 (5.15 grams), FoamStar SI 2240 (0.10 grams), and deionized water (7.27 grams). This formulation was agitated for 20 minutes at ambient temperature. The aqueous formulation had a resulting viscosity=150 cps (Brookfield RV, spindle #2 at 30 rpm, 23° C.) and solid content=41.3 wt. %.

Example 5: Packaging Coating Formulation

A coating composition was prepared by adding in sequential order with agitation: Example 2 (55.35 grams), Example 3 (18.48 grams), resin dispersion PD2 (16.10 grams), Joncryl Wax 28 (5.30 grams), FoamStar SI 2240 (0.10 grams), and deionized water (4.67 grams). This formulation was agitated for 20 minutes at ambient temperature. The aqueous formulation had a resulting viscosity=131 cps (Brookfield RV, spindle #2 at 30 rpm, 23° C.) and solid content=42.9 wt. %.

Example 6: Packaging Coating Formulation

A coating composition was prepared by adding in sequential order with agitation: Example 2 (38.61 grams), Example 3 (38.61 grams), resin dispersion PD2 (16.81 grams), Joncryl Wax 28 (5.53 grams), FoamStar SI 2240 (0.11 grams), and deionized water (0.33 grams). This formulation was agitated for 20 minutes at ambient temperature. The aqueous formulation had a resulting viscosity=152 cps (Brookfield RV, spindle #2 at 30 rpm, 23° C.) and solids=45.6 wt. %.

Example 7: Packaging Coating Formulation

A coating composition was prepared by adding in sequential order with agitation: Example 3 (74.65 grams), resin dispersion PD2 (16.27 grams), Joncryl Wax 28 (5.35 grams), FoamStar SI 2240 (0.11 grams), Sterocoll FS (0.47 grams) and deionized water (3.15 grams). This formulation was agitated for 20 minutes at ambient temperature. The aqueous formulation had a resulting viscosity=155 cps (Brookfield RV, spindle #2 at 30 rpm, 23° C.) and solid content=46.1 wt. %.

Example 8: Packaging Coating Formulation

A coating composition was prepared by adding in sequential order with agitation: Example 2 (60 grams), Example 3 (40 grams), and deionized water (1.45 grams). This formulation was agitated for 20 minutes at ambient temperature. The aqueous formulation had a resulting viscosity=124 cps (Brookfield RV, spindle #2 at 30 rpm, 23° C.) and solid content=47.9 wt. %.

Example 9: Packaging Coating Formulation

A coating composition was prepared by adding in sequential order with agitation: Example 2 (50 grams) and Example 3 (50 grams). This formulation was agitated for 20 minutes at ambient temperature. The aqueous formulation had a resulting viscosity=126 cps (Brookfield RV, spindle #2 at 30 rpm, 23° C.) and solid content=50.03 wt. %.

Example 10: Packaging Coating Formulation

A coating composition was prepared by adding in sequential order with agitation: Example 2 (40 grams) and Example 3 (60 grams). This formulation was agitated for 20 minutes at ambient temperature. The aqueous formulation had a resulting viscosity=109 cps (Brookfield RV, spindle #2 at 30 rpm, 23° C.) and solid content=48.96 wt. %.

Example 11: Measurement of Block Resistance of Coated Substrate

Coating Application: Uniform flexo coatings were applied to a substrate using a Pamarco Automatic Proofer at a specified coat weight. Each coating layer was dried for one minute at 60° C. in the oven.

Coatings were applied with 2 passes of the 120*LPI (22.6 BCM) or 140†LPI (17.9 BCM) hand proofer using the same polymeric resin as unless unwise indication. Coat weights were determined with a theoretical 25% transfer.

Block Resistance: Block resistance tests were carried out to determine the resistance of the polymer binder to stick to itself and uncoated paper under pressure and at elevated temperatures. The tests measure the extent of tackiness and damage that a coated substrate experiences when subjected to standard temperature, pressure, and time. Rolls of coated paper stock can achieve an internal pressure of up to 60 psi, depending on paper uniformity. When stored or transported under tropical conditions (30° C. and 95% relative humidity), coated paper layers can stick together, and, in the worst-case scenario, the paper or coating can be significantly damaged. Block resistance tests were performed at 50° C. and 60 psi for 24 hours. Samples were cut 1×3 inches and two sheets were layered coating-to-paper (face-to-back, F-B) or coating-to-coating (face-to-face, F-F) in a block testing apparatus. A spring was then placed on top of the layers to apply a certain amount of pressure on the samples. The entire apparatus was placed in an oven capable of humid conditions at 50N C for 24 hours. A Koehier Instrument K53000 I.C. block tester was used for this testing. When the block test was completed, the samples were removed and monitored for tack and damage of samples. The rating system is described in Table 3. Block resistance data are shown in Table 4.

TABLE 3

Rating system for block resistance tests.

| Rating | Explanation |
|---|---|
| 5-No Blocking | No adhesion or cohesion (no tack between the two sheets). Sheets slide or peel freely from one another with no paper substrate damage. |
| 4-Slight Cling | Slight ticking can be heard as the samples are peeled (slight tack between the two sheets). No visible distortion and no paper substrate damage. |
| 3-Cling | Noticeable adhesion between adjacent surfaces (significant tack between the two sheets) & visual distortion of the surfaces. No distortion of webs or offset printing inks or lacquers, no paper substrate damage. |
| 2-Slight Blocking | Slight adhesion. Adjacent surfaces do not separate freely, but will with frictional slide or peel pressure. Surface of specimen may show slight distortion. Less than 50% paper substrate damage. |
| 1-Considerable Blocking | Adhesion or cohesion of contiguous surfaces. Layers may be separated with difficulty. Surfaces will be distorted. More than 50% paper substrate damage. |
| 0-Complete Blocking | Blocking to the extent of a complete seal or weld between adjacent surfaces which cannot be separated without destruction of the test specimen. |

TABLE 4

Block Resistance Data

| Example | Formulation Example | Coat Weight | Blocking F-F | Blocking F-B |
|---|---|---|---|---|
| 12-1 | 5 | 7.81 | 3.5 | 4 |
| 12-2 | 6 | 8.30 | 3.5 | 4 |
| 12-3 | 7 | 8.39 | 3 | 3 |
| 12-4 | 4 | 5.91 | 3.5 | 4 |

Example 12: Measurement of Oil and Grease Resistance of a Coated Substrate

Starting with coated samples on paper as prepared in Example 11, three replicates of each sample were cut, and samples were tested flat and creased. Once the samples were cut, three samples were creased using the carton crease proofer; samples were placed on the proofer with coated side down and then folded on the inside. One gram of a 2 wt. % sudan blue/oleic acid mixture was applied to a folded paper towel and placed on the middle of a flat glass panel. The coated side of the coated test sample was placed on top of the oil-soaked paper towel piece. Another glass plate was placed on top of the test sample. After intervals of 1, 5 and 24 hours, the samples were evaluated to see if the sample was experiencing failure mode as judged by blue dye leaching through the test coating.

TABLE 5

Crease and fold grease resistance in percentage by area at ambient temperature

| Example | Formulation Example | One Hour | 5 Hours | 24 Hours |
|---|---|---|---|---|
| 13-1 | Example 4 | 0.00 | 0.72 | 7.25 |
| 13-2 | Example 5 | 0.00 | 0.00 | 0.72 |
| 13-3 | Example 6 | 0.00 | 0.72 | 1.45 |
| 13-4 | Example 7 | 0.00 | 2.90 | 7.25 |

Ambient temperature = 23° C.

TABLE 6

Crease and fold grease resistance at 60° C. temperature

| Example | Formulation Example | One Hour | 2 Hours | 3 Hours |
|---|---|---|---|---|
| 13-1 | Example 4 | 57.97 | >70 | >70 |
| 13-2 | Example 5 | 22.46 | 38.41 | 53.62 |
| 13-3 | Example 6 | 1.45 | 3.62 | 5.80 |
| 13-4 | Example 7 | 3.62 | 7.97 | 9.42 |

Discussion of Results

The results in the Tables 4, 5, 6 and Examples 1 to 10 show that the aqueous composition of the presently claimed invention provides blocked resistance and improved oil and grease resistance to substrates coated with the aqueous composition disclosed herein. It was unexpectedly found that when the glass transition temperature, Tg of both the first and second polymer in the composition was below 0° C., block resistance was still achieved. Tables 5 and 6 shows the rating of percentage by coating area at each timeframe which correlates to the penetration of oil and grease through the coating. From the results recorded in these tables, it is indicative that the aqueous compositions according to the presently claimed invention show excellent crease and fold grease resistance in percentage by area as lower the value per area, the better is the resistance. The improved properties of coated substrate results from synergistic effect of the components of the composition, specifically the first polymer and the second polymer in the aqueous composition disclosed herein. The second polymer when taken alone, though provides grease resistance at ambient temperature, fails at elevated temperature. Whereas the aqueous compositions as disclosed herein provides good grease resistance at both ambient and elevated temperature, for example at 60° C.

The ratio of volume average particle size of the first polymer and second polymer in the aqueous composition enables better packing during film formation to achieve the better grease resistance from the first polymer while also maintaining the block resistance of the second polymer. In addition, from the examples 1 to 10, it can be seen that the aqueous composition disclosed herein enables to achieve high solid content at low viscosity, which is required for ease of printing of paper. It was a surprising outcome that the viscosity of the final aqueous composition resulted in much lower value than the viscosity of first polymer and the second polymer separately. The unique composition as disclosed herein also improves coating transfer with water resistance. The second polymer when used alone is good for water resistance when coated by wire wound bar but does not get enough transfer to build coat weight by flexographic printing.

Test Methods

Molecular weight determination: Gel permeation chromatography (GPC) spectra were acquired with a Waters 2695 instrument and was used to determine molecular weight of polymers using tetrahydrofuran (THF) as the mobile phase at 40° C. and a RI detector. All samples were analysed for number average molecular weight (Mn), weight average molecular weight (Mw), and polydispersity (PDI) using elution times calibrated against polystyrene molecular weight standards.

The number average molecular weight (Mn) is the statistical average molecular weight of all the polymer chains in the polymer and is defined by:

$$M_n = (\Sigma N_i M_i)/\Sigma N_i$$

where Mi is the molecular weight of a chain and Ni is the number of chains of that molecular weight.

The weight average molecular weight (Mw) is defined by:

$$M_w = (\Sigma N_i M_i^2)/\Sigma N_i$$

Compared to Mn, Mw considers the molecular weight of a chain in determining contributions to the molecular weight average. The more massive the chain, the more the chain contributes to Mw. Higher average molecular weights (Mz) can be defined by the equation:

$$M_z = (\Sigma N_i M_i^3)/\Sigma N_i$$

The dispersity index or polydispersity index (PDI) is a measure of the distribution of molecular mass in a given polymer sample. PDI of a polymer is calculated:

$$PDI = Mw/Mn$$

where the weight average molecular weight and the statistical average molecular weight are defined above.

Solid content determination: The solid content of the dispersions was measured gravimetrically by drying about 0.5 g to about 2 g sample of dispersions in a 140° C. oven for 1 hour.

Viscosity determination: The viscosity was measured by a Brookfield LV at 20° C. to 25° C.

Particle size determination including volume average particle size: Particle size of the dispersions were measured using a nano-flex particle sizer from Microtrac.

Acid value determination: Acid value or number was measured by potentiometric titration according to ASTM D664-95.

Glass Transition Temperature determination: Glass transition temperature (Tg) was measured by differential scanning calorimetry (DSC) according to ASTM D3418-15.

Minimum Film Formation Temperature (MFFT) determination: The MFFT was measured according to ASTM D2354-10.

The invention claimed is:
1. An aqueous composition comprising:
(i) at least one first polymer in an amount in a range of from about 10 wt. % to about 90 wt. % derived from at least one first monomer selected from the group consisting of ethylenically substituted aromatic compounds and at least one second monomer selected from the group consisting of (meth) acrylonitrile, (meth) acrylamide, (meth) acrylic acid, alkyl (meth) acrylates and mixtures thereof; and (ii) at least one second polymer in an amount in a range of from about 10 wt. % to about 90 wt. % comprising the reaction product of a partially neutralized, acid-functional support resin and at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydride and mixtures thereof; and wherein the wt. % is based on a total weight of the aqueous composition, wherein a ratio of volume average particle size diameter of the at least one first polymer to volume average particle size diameter of the at least one second polymer is in a range of from about 20:1 to about 2:1, and wherein the at least one first monomer is different from the at least one second monomer.

2. The aqueous composition according to claim 1, wherein a viscosity of the aqueous composition is in a range of from about 100 cp to about 2500 cp, determined using a viscometer with a #2 spindle at 50 rpm at 23° C.

3. The aqueous composition according to claim 1, wherein a solid content of the aqueous composition is in a range of from about 20 wt. % to about 70 wt. %, based on a total weight of the aqueous composition.

4. The aqueous composition according to claim 1, wherein a weight average molecular weight of the first polymer is in a range of from about 20 kDa to about 500 kDa determined according to gel permeation chromatography.

5. The aqueous composition according to claim 1, wherein a volume average particle size diameter of the first polymer is in a range of from about 90 nm to about 400 nm determined according to dynamic light scattering technique.

6. The aqueous composition according to claim 1, wherein a viscosity of the first polymer is in a range of from about 100 cp to about 2500 cp, determined using a viscometer with a #2 spindle at 50 rpm at 23° C.

7. The aqueous composition according to claim 1, wherein the ethylenically substituted aromatic compound is selected from the group consisting of styrene, methylstyrene, butylstyrene, decylstyrene, vinyltoluene, indene, methylindenes and mixtures thereof.

8. The aqueous composition according to claim 1, wherein an amount of the first monomer is in a range of from about 10 wt. % to about 50 wt. % and an amount of the second monomer is in a range of from about 10 wt. % to about 90 wt. % based on a total weight of the first polymer.

9. The aqueous composition according to claim 1, wherein an amount of the first monomer is in a range of from about 10 wt. % to about 40 wt. % and an amount of the second monomer is in a range of from about 20 wt. % to about 90 wt. % based on a total weight of the first polymer.

10. The aqueous composition according to claim 1, wherein an amount of the at least one first monomer is in a range of from about 10 wt. % to about 30 wt. % and an amount of the at least one second monomer is in a range of from about 70 wt. % to about 90 wt. % based on a total weight of the first polymer.

11. The aqueous composition according to claim 1, wherein the partially neutralized, acid-functional support resin is selected from the group consisting of ammonium salt of a modified acrylic copolymer, an amine salt of a modified acrylic copolymer and mixtures thereof.

12. The aqueous composition according to claim 11, wherein the modified acrylic copolymer is derived from the group consisting of (meth) acrylic acid monomers, (meth) acrylate monomers, vinyl aromatic monomers and mixtures thereof.

13. The aqueous composition according to claim 1, wherein a weight average molecular weight of the second polymer is in a range of from about 100 kDa to about 1000 kDa determined according to gel permeation chromatography.

14. The aqueous composition according to claim 1, wherein a volume average particle size diameter of the second polymer is in a range of from about 50 nm to about 200 nm determined according to dynamic light scattering technique.

15. The aqueous composition according to claim 1, wherein a viscosity of the second polymer is in a range of from about 100 cp to about 5000 cp determined using a viscometer with a #2 spindle at 50 rpm at 20° C.

16. The aqueous composition according to claim 1, wherein a weight average molecular weight of the partially neutralized, acid-functional support resin is in a range of from about 2 kDa to about 20 kDa determined according to gel permeation chromatography.

17. The aqueous composition according to claim 1, wherein the partially neutralized, acid-functional support resin of the second polymer is neutralized with a base selected from the group consisting of ammonia, sodium hydroxide, potassium hydroxide, organic amine and mixtures thereof.

18. The aqueous composition according to claim 1, wherein partially neutralized refers to neutralization of at least about 5 mol % of acid groups on the acid-functional support resin with a base.

19. The aqueous composition according to claim 1, wherein the second polymer comprises a partially neutralized, acid-functional support resin in an amount of about 10 wt. % to about 50 wt. % and at least one ethylenically-unsaturated monomer in an amount in a range of from about 5 wt. % to about 90 wt. % based on a total weight of the second polymer.

20. The aqueous composition according to claim 1, further comprising a wax in an amount in a range of from about 0.10 wt. % to about 25 wt. % based on a total weight of the aqueous composition.

21. The aqueous composition according to claim 20, wherein the wax is an aqueous emulsion.

22. The aqueous composition according to claim 21, wherein the aqueous emulsion is selected from the group consisting of paraffins, polyethylene, polypropylene, microcrystalline waxes, fluorinated waxes, ethylene copolymer waxes, propylene copolymer waxes and mixtures thereof.

23. The aqueous composition according to claim 1, further comprising a surfactant.

24. The aqueous composition according to claim 23, wherein the surfactant is anionic or non-ionic.

25. The aqueous composition according to claim 24, wherein the surfactant is selected from the group consisting of alkyl sulfonates, alkyl benzene sulfonates, alkyl sulfates, alkyl benzene sulfates, phosphates, phosphinates, fatty carboxylates and mixtures thereof.

26. The aqueous composition according to claim 24, wherein the surfactant comprises at least one fatty alcohol ethoxylate.

27. The aqueous composition according to claim 24, wherein the surfactant comprises at least one alkylsulfosuccinate ethoxylate.

28. The aqueous composition according to claim 24, wherein the surfactant comprises at least one alkylsulfosuccinate ethoxylate and at least one fatty alcohol ethoxylate.

29. The aqueous composition according to claim 24, wherein the surfactant comprises at least one fatty alcohol having an alkyl chain length of about 12 carbons to about 18 carbons and a degree of ethoxylation of about 10 molar ethylene oxide units to about 80 molar ethylene oxide units.

30. A substrate comprising at least one surface coated with at least one layer comprising an aqueous composition according to claim 1.

31. The substrate according to claim 30, wherein the substrate is paper or paperboard.

32. A coated paper or an article comprising the dried aqueous composition according to claim 1.

33. The coated paper or the article according to claim 32, wherein the aqueous composition has a coating weight in a range of from about 2 g/m² to about 30 g/m² of the coated paper.

34. The coated paper according to claim 33, wherein the coated paper has a block resistance of 3 or greater for 24 hours at 60° C. and 60 psi determined according to ASTM WK20008.

35. The coated paper according to claim 33, wherein the paper exhibits oil and/or grease resistant properties.

36. A method of making paper comprising at least the step of contacting a cellulosic fiber with an aqueous composition according to claim 1.

37. The method according to claim 36, wherein the step of contacting the cellulosic fiber with the aqueous composition comprises coating a paper web comprising a cellulosic fiber with an aqueous dispersion comprising the aqueous composition.

38. The method according to claim 36, wherein contacting the cellulosic fiber with the aqueous composition comprises (i) mixing an aqueous dispersion comprising the aqueous composition with the cellulosic fibers to form a slurry; and (ii) forming a paper web from the slurry of the cellulosic fibers and the aqueous composition.

* * * * *